United States Patent
Peppel

(10) Patent No.: US 6,607,065 B2
(45) Date of Patent: Aug. 19, 2003

(54) HIGH SPEED BAGGAGE DIVERTER

(75) Inventor: George W. Peppel, Corsicana, TX (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/921,685

(22) Filed: Aug. 3, 2001

(65) Prior Publication Data

US 2002/0070094 A1 Jun. 13, 2002

Related U.S. Application Data

(60) Provisional application No. 60/224,621, filed on Aug. 11, 2000.

(51) Int. Cl.$^7$ .............................................. B65G 37/00
(52) U.S. Cl. .................................... 198/367; 198/370.01
(58) Field of Search ....................... 198/370.01, 370.08, 198/370.1, 367

(56) References Cited

U.S. PATENT DOCUMENTS

| | | | |
|---|---|---|---|
| 1,729,671 A | 10/1929 | Bell-Irving et al. | |
| 1,909,481 A | 5/1933 | Allen | |
| 2,649,187 A | 8/1953 | Eggleston ................... | 198/185 |
| 3,026,988 A | 3/1962 | Fisk ............................ | 198/24 |
| 3,045,801 A | 7/1962 | Braybeal ..................... | 198/24 |
| 3,093,236 A | 6/1963 | McLaughlin ................ | 198/185 |
| 3,104,755 A | 9/1963 | Zuercher .................... | 198/185 |
| 3,246,733 A | 4/1966 | Torbet et al. ............... | 198/185 |
| 3,397,779 A | 8/1968 | Wilder ........................ | 209/74 |
| 3,578,141 A | 5/1971 | Sheeham .................... | 198/33 |
| 3,721,331 A * | 3/1973 | Holbrook et al. ........... | 198/367 |
| 4,298,117 A | 11/1981 | Kobayashi et al. ......... | 198/367 |
| 4,441,604 A | 4/1984 | Schlig et al. ............... | 198/598 |
| 4,643,291 A | 2/1987 | Counter et al. ............. | 198/356 |
| 4,711,357 A | 12/1987 | Langenbeck et al. ....... | 209/565 |
| 4,850,471 A | 7/1989 | Annas, Sr. et al. ...... | 198/349.3 |
| 5,010,998 A | 4/1991 | MacMillan .................. | 198/372 |
| 5,217,104 A | 6/1993 | Pelletier ..................... | 198/367 |
| 5,452,786 A | 9/1995 | Gilmore ...................... | 198/367 |
| 5,655,643 A | 8/1997 | Bonnet .................... | 198/370.08 |
| 5,871,078 A * | 2/1999 | Arnarson et al. ........... | 198/358 |

FOREIGN PATENT DOCUMENTS

| | | |
|---|---|---|
| DE | 2242457 | 4/1973 |
| DE | 2620036 | 11/1977 |
| JP | 5836820 | 3/1983 |
| JP | 60232320 | 11/1985 |

OTHER PUBLICATIONS

PCT International Search Report dated Feb. 28, 2002, for a corresponding international application which is based on the present application.

\* cited by examiner

Primary Examiner—Christopher P. Ellis
Assistant Examiner—Richard Ridley
(74) Attorney, Agent, or Firm—Van Dyke, Gardner Linn & Burkhart, LLP

(57) ABSTRACT

A diverter assembly according to the present invention includes a generally horizontal conveying surface, a pair of flipper assemblies, and an actuator for substantially concurrently actuating the flipper assemblies to an actuated position whereby the flipper assemblies are collinear. A driven diverting surface is defined on each flipper assembly wherein an article on the conveying surface is diverted when the article contacts one of the flipper assemblies when the flipper assembly is in its actuated position.

63 Claims, 21 Drawing Sheets

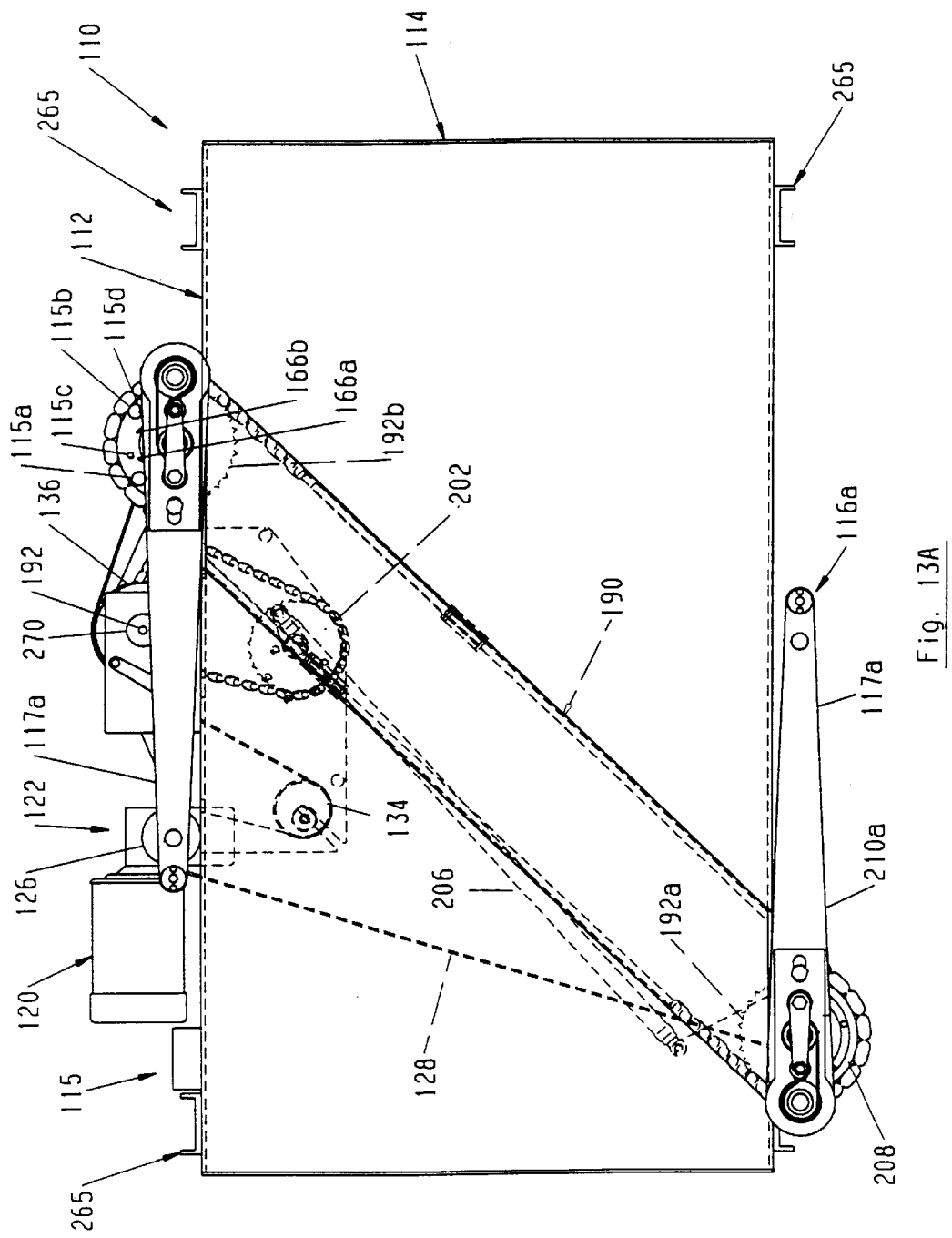

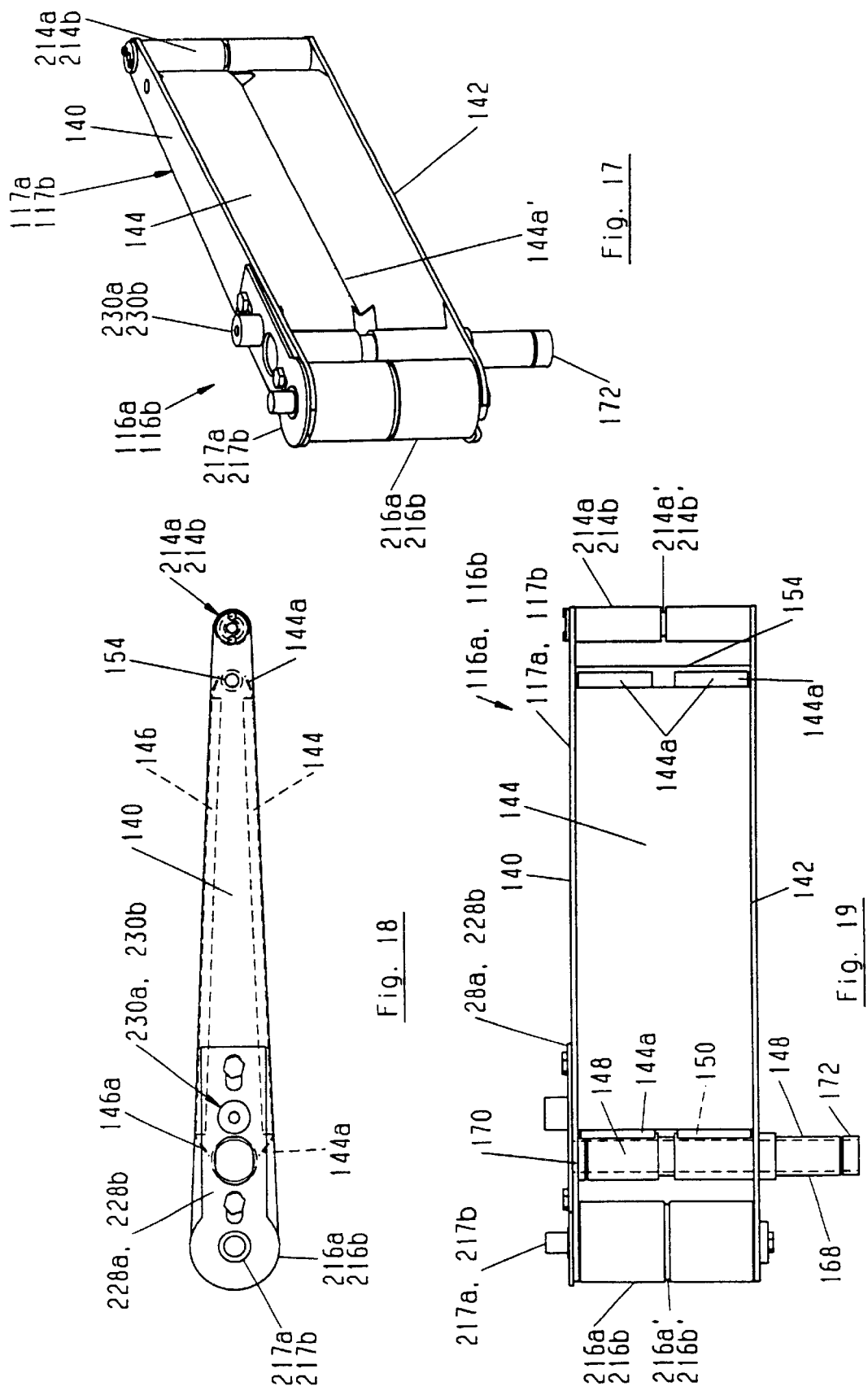

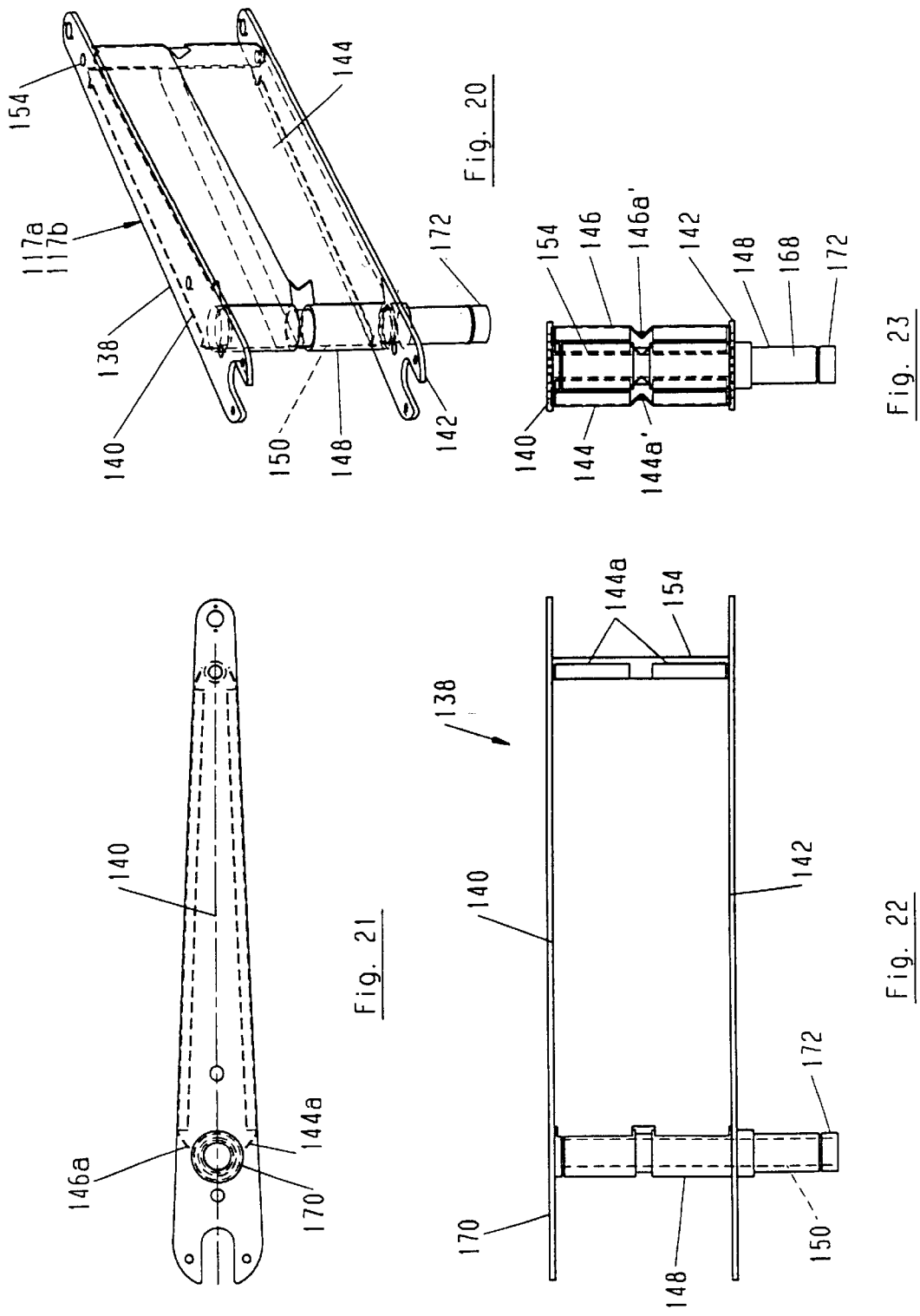

HIGH SPEED BAGGAGE DIVERTER

This application claims priority from provisional application entitled HIGH SPEED BAGGAGE DIVERTER, Ser. No. 60/224,621, filed Aug. 11, 2000, the disclosure of which is incorporated by reference herein in its entirety.

TECHNICAL FIELD AND BACKGROUND OF THE INVENTION

The present invention pertains to article diverters and, in particular, to high-speed diverters. Although the invention finds particular application to the diverting of baggage, such at airport baggage handling systems, or the like, the invention may find other applications.

Diverters for irregularly shaped articles, such as baggage, share many of the same goals and challenges that diverters for regularly shaped articles, such as boxes or containers, face. One goal is to sort the articles at a high rate so that the diverting or sorting function does not significantly slow the throughput of the articles. Another goal is to minimize damage to the articles being diverted. The faster the rate of the throughput, the greater the challenge this becomes.

Similar to boxes and containers, baggage can vary in their weight, size, and centroid location. In contrast to boxes or containers, baggage can vary greatly in their shape and composition. For example, baggage may include a relatively rigid suitcase, a duffle bag, a ski bag, a golf bag, or the like. Some baggage, such as duffel bags, is malleable. When pushed they may change shape or roll. This variation in shape and malleability of these irregularly shaped articles makes sortation even more challenging than sortation of regularly shaped articles. For example, baggage may be more susceptible to damage than articles, such as containers, because of the material forming the baggage, such as in the case of duffle bags, does not absorb any significant impact. Furthermore, given the variation in size and shape of baggage, larger articles, such as large trunks may topple over the diverter when diverted by many conventional diverters. Furthermore, baggage may include straps or loose handles, which can be easily snagged or caught up in a diverter assembly.

Consequently, there is a need for a diverter that can divert a variety of articles, including regularly shaped or irregularly shaped articles, at a high speed of sortation without the attendant problems associated with conventional diverters.

SUMMARY OF THE INVENTION

Accordingly, a diverter assembly of the present invention has a particular application as a high-speed diverter and may be used to divert articles, such as baggage or the like.

In one form of the invention, the diverter assembly includes a generally horizontal conveying surface, a pair of flipper assemblies on opposite sides of the conveying surface which are collinear when in an actuated position, and a driven diverting surface defined on each flipper assembly. The diverter assembly further includes an actuator for selectively and substantially concurrently actuating the flipper assemblies to their actuated positions, where an article on the conveying surface is diverted, and driving the diverting surface.

In one aspect, the diverting surface is defined by a driven surface, such as a drive belt.

In other aspects, the diverting surfaces of the flipper assemblies are at an angle with respect to the direction of travel of the articles on the horizontal conveying surface that is in a range from 20° to 60°. In a further aspect, the angle is approximately 45°.

According to yet another aspect, the actuator extends downwardly from the horizontal conveying surface no more that 18 inches. In a further aspect, the actuator extends downwardly from the horizontal conveying surface no more than 12 inches.

In yet another aspect, the diverter assembly is capable of diverting at least 60 articles per minute and, in some applications, is capable of diverting at least 80 articles per minute. In yet other applications, the diverter assembly is capable of diverting upwards of 140 articles per minute.

According to another form of the invention, a diverter assembly includes a conveying surface having a conveying direction, a pair of arms at opposed sides of the conveying surface, a driven diverting surface defined at both arms, and a drive assembly. The arms are mounted for pivotal movement between a non-diverting position wherein the arms are adjacent the conveying surface and a diverting position wherein the arms are pivoted across the conveying surface for diverting one or more articles conveyed on the conveying surface in a transfer direction. The drive assembly selectively and substantially currently moves the arms between their diverting position and their non-diverting position wherein an article on the conveying surface is diverted when the article contacts at least one of the arms when the arm is in its diverting position. In addition, the drive assembly drives the driven diverting surfaces at a speed that is approximately equal to the speed of the conveying surface divided by the cosine of the angle between the conveying direction of the conveying surface and the transfer direction of the diverter assembly.

In one aspect, the arms are generally collinear when the arms are pivoted to their diverting positions. In another aspect, at least one of the arms comprises a horizontal extent and a belt extending around the horizontal extent. The belt is driven about the horizontal extent and provides the diverting surface for that arm.

According to another aspect, the diverting surfaces comprise driven belts. For example, the driven belts are driven by rollers. In a further aspect, each roller includes a driven axis about which the respective roller is driven. The arms pivot about their respective pivot axis when pivoting between their non-diverting position and their diverting position. Optionally, the drive assembly may be adapted to decouple movement of the driven belts about their driven axis from movement of their respective arm about their pivot axis. For example, the drive assembly may include a clutch assembly.

In yet a further aspect, each driven axis is collinear with its respective pivot axis. In an alternate aspect, the driven axes and the pivot axes are spaced apart.

In another form of the invention, a diverter assembly includes a generally horizontal conveying surface, a pair of arms at opposed sides of the conveying surface, a driven diverting surface defined at each of the arms, and a drive assembly for selectively moving the arms between a diverting position and a non-diverting position. In the diverting position, the arms are pivoted with a portion of the arms extending across the conveying surface and another portion of the arms extending beyond the conveying surface, which continues to drive a diverted article when the diverted article is diverted off the conveying surface.

In one aspect, each of the arms includes a distal end, which are generally adjacent when the arms are pivoted to their diverting position. In another aspect, the distal ends of the arms are spaced apart when the arms are pivoted to the diverted position.

According to yet another form of the invention, a diverter assembly includes a generally horizontal conveying surface, a pair of arms which are mounted at opposed sides of the conveying surface, a driven diverting surface which is defined at each of the arms, and a drive assembly. The arms are mounted for pivotal movement between a non-diverting position wherein the arms are adjacent the conveying surface and a diverting position wherein at least a portion of the arms are pivoted across the conveying surface. The arms are spaced longitudinally along the conveying direction of the conveying surface wherein distal ends of the arms are offset and spaced apart when the arms are moved to their diverting position. The drive assembly selectively moves the arms between the diverting position and the non-diverting position.

In one aspect, the drive assembly drives the driven diverting surface and, further, drives the driven diverting surfaces at a speed approximately equal to the conveying speed of a conveying surface divided by a cosine of an angle between the conveying direction and the diverting direction. In this manner, when the article makes contact with the diverting surface, the forward vector component of the belt speed will approximately equal the forward speed of the article. As a result, the speed of the article will remain substantially unchanged.

In yet another form of the invention, a diverter assembly includes a conveyor section having a generally horizontal conveying surface, a pair of arms at opposed sides to the conveying surface, and a drive assembly. The arms are mounted for pivotal movement between a non-diverting position and a diverting position wherein at least a portion of the arms are pivoted across the conveying surface. The conveying surface is adapted to be selectively lowered at the arms when the arms are in their diverting position to release any articles caught between the conveying surface and the arms. The drive assembly selectively moves the arms between the diverting position and the non-diverting position.

In one aspect, the diverter assembly further includes a driven diverting surface defined at each of the arms; for example, the diverting surfaces may comprise driven belts. In a further aspect, the driven belts are driven at a speed equal to the conveying speed of the conveying surface divided by a cosine of an angle between the conveying direction and the diverting direction to thereby maintain the forward speed of the article being diverted generally constant.

According to yet another form of the invention, the diverter assembly includes a generally horizontal conveying surface, a pair of arms, and a driven diverting surface which is defined at each of the arms. The driven diverting surface has a vertical height of at least twelve inches whereby contact between an article and the arms will occur at or above the centroid of most articles. The diverter assembly further includes a drive assembly for selectively moving the arms between a non-diverting position wherein the arms are adjacent the conveying surface and diverting position wherein at least portion of the arms are pivoted across the conveying surface.

In one aspect, the driven diverting surfaces comprise driven belts. For example, each of the arms may include a horizontal extent, with the driven belts driven around the horizontal extents of the arms. In a further aspect, the driven belts are rotated about a pair of belt axes with the arms pivoting about a pivot axis spaced inwardly from one of the belt axes.

It can be appreciated from the foregoing that the diverter assembly of the present invention can divert articles that are conveyed at a relative high-speed without significantly, if at all, reducing the rate at which the articles are handled. Furthermore, since an article is redirected without significantly reducing the articles forward motion, the impact to the article being diverted is minimal.

These and other objects, advantages, purposes, and features of the invention will become more apparent from the study of the following description taken in conjunction with the drawings.

BRIEF DESCRIPTION OF THE DRAWINGS

FIG. 13A is a top plan view of the diverter assembly of FIG. 12 illustrating the flipper assembly arms in a non-diverting position;

FIG. 17 is a perspective view of a flipper assembly of the diverter assembly of FIGS. 12–16;

FIG. 18 is a top plan view of the flipper assembly of FIG. 17;

FIG. 19 is an elevation view of the flipper assembly of FIGS. 17–18;

FIG. 20 is a perspective view of the flipper frame of a flipper assembly of FIGS. 17–19;

FIG. 21 is a top plan view of flipper frame of FIG. 20;

FIG. 22 is an elevation view of the flipper frame of FIGS. 20–21;

FIG. 23 is an end elevation view of the flipper frame of FIG. 22; and

DESCRIPTION OF THE PREFERRED EMBODIMENT

Figure 1:
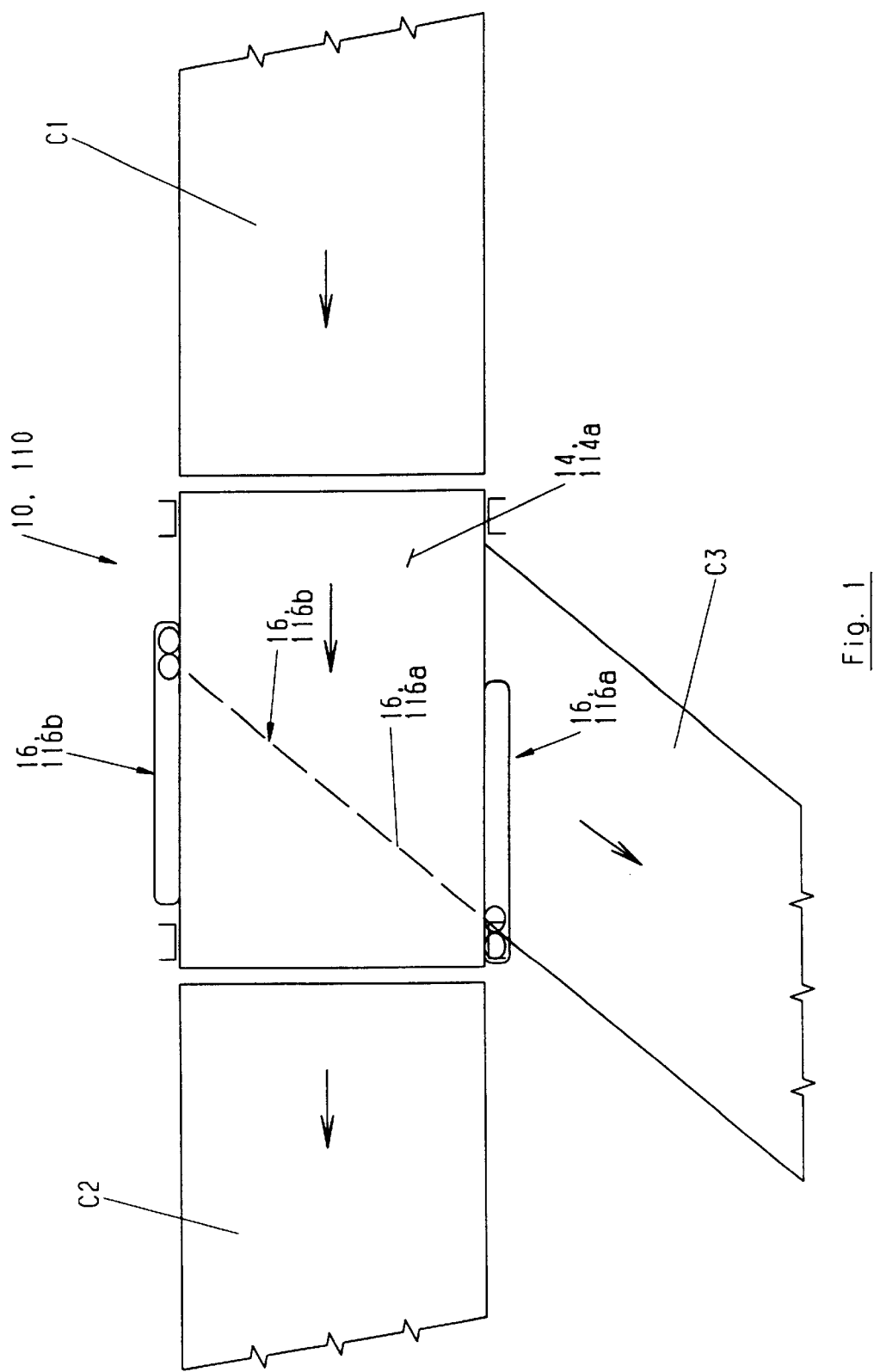
FIG. 1 is a plan view of a conveyor system incorporating the high-speed diverter assemblies of the present invention.

Referring to the drawings and the illustrative embodiments depicted therein, the numeral 10 generally designates a high-speed diverter assembly of the present invention. High-speed diverter assembly 10 is particularly suitable for diverting articles, such as baggage, and is typically positioned between two conveyor sections C1 and C2 so that articles conveyed on, for example, C1 may be diverted to a take-away conveyor section or chute C3 (FIG. 1), which is positioned adjacent diverter assembly 10. High-speed diverter assembly 10 includes a horizontal conveying surface 14, a pair of flipper assemblies 16, and a flipper actuator or drive assembly 18. Horizontal conveying surface 14 includes a bed or belt support surface 20 and a pair of guide pulleys or rollers 22a, 22b for supporting a driven belt (not shown), which typically would extend well beyond baggage diverter assembly 10. It should be understood that other types of conveying surfaces, such as driven rollers, or the like, may be used to propel articles past or through baggage diverter assembly 10. As will be more filly described below, flipper assemblies 16 are adapted so that they selectively and quickly divert articles conveyed on conveying surface 14 away from the conveying direction of conveyor sections C1 and C2 but with minimal impact on the articles being diverted.

Figure 2:
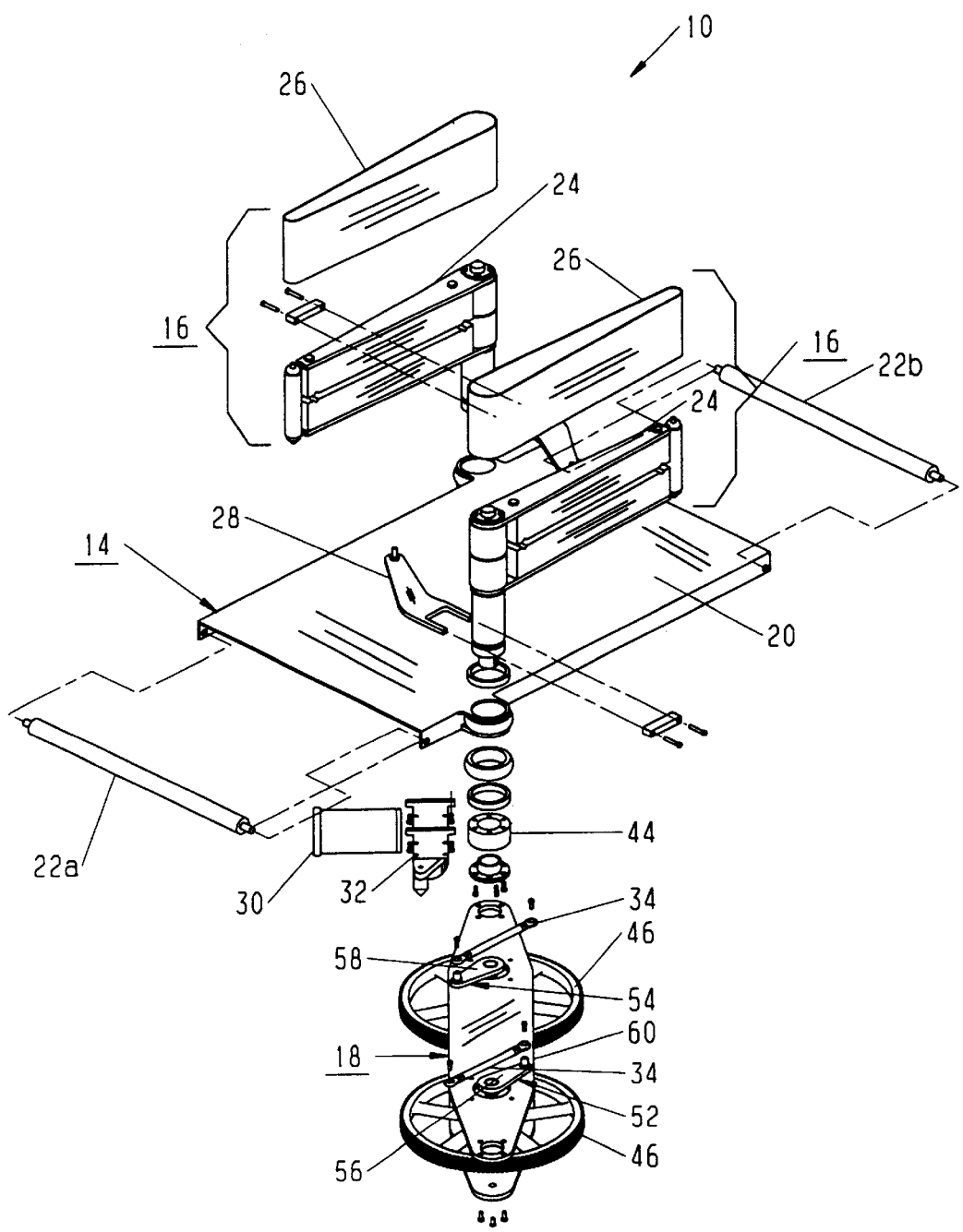
FIG. 2 is a perspective view of a first embodiment of a high-speed baggage diverter according to the present invention.
Figure 3:
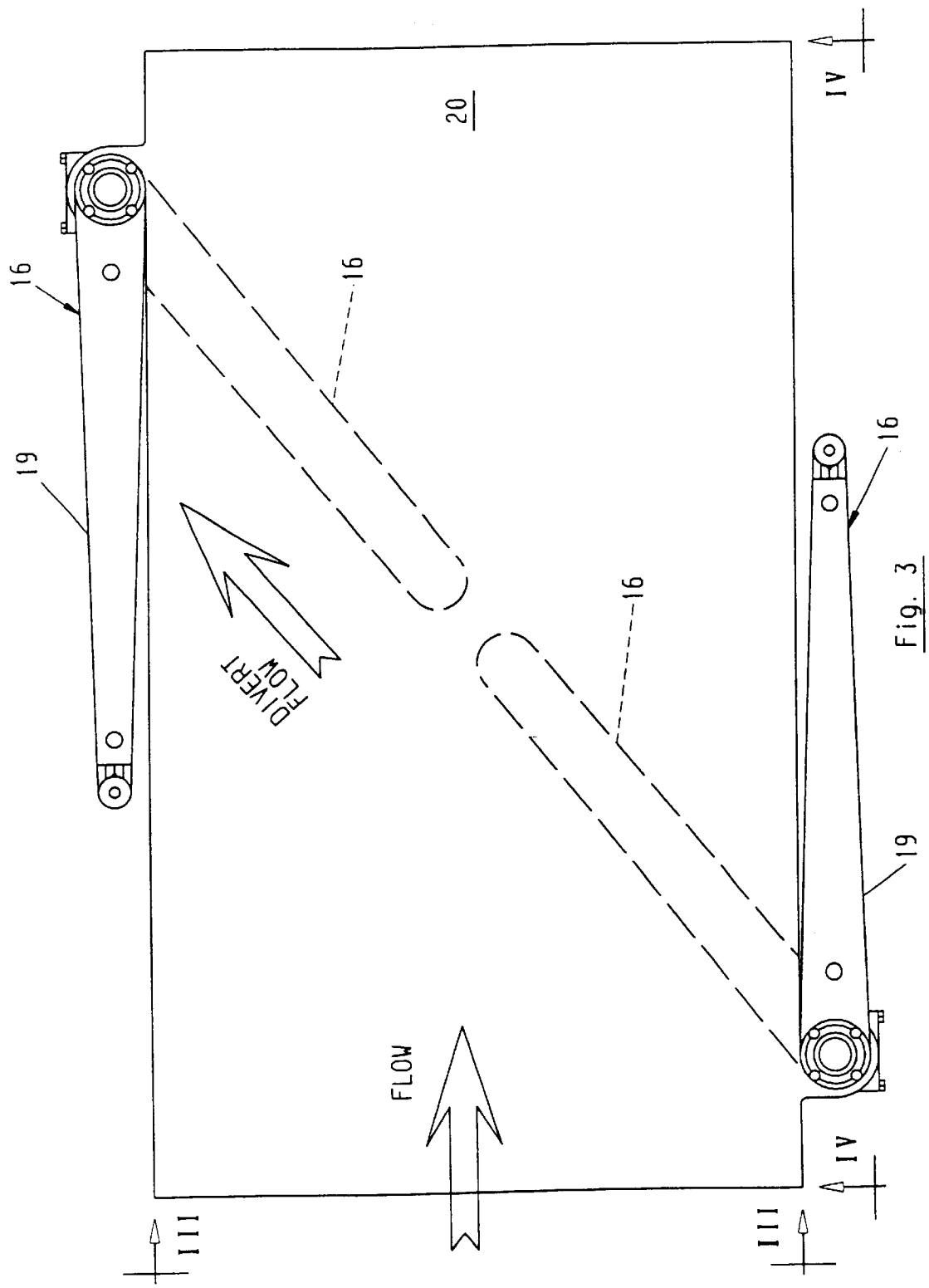
FIG. 3 is a top plan view of the baggage diverter in FIG. 2.
Figure 4:
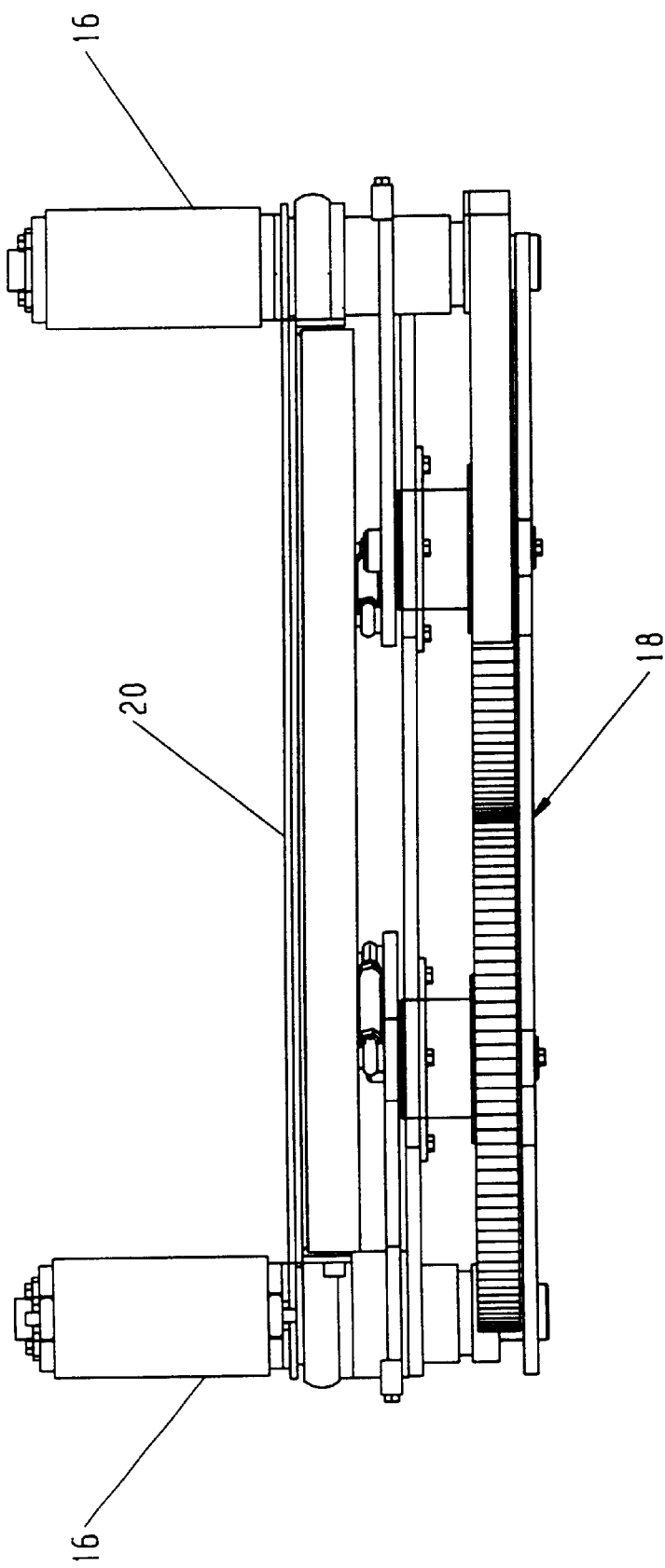
FIG. 4 is an end elevation taken from the view IV—IV in FIG. 3.
Figure 5:
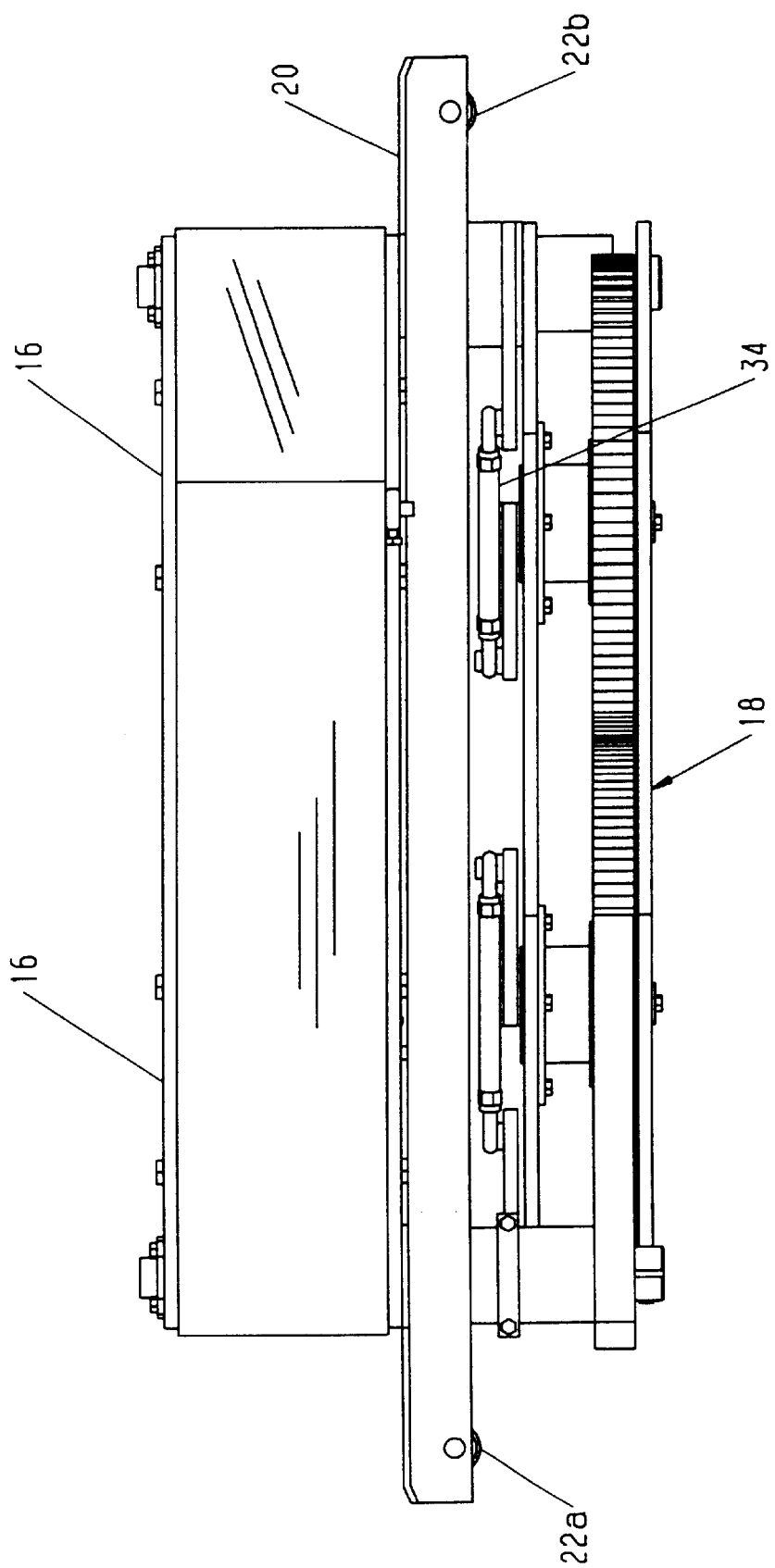
FIG. 5 is a side elevation taken from the view V—V in FIG. 4.

Each flipper assembly 16 includes an arm 19 (FIG. 3) which comprises a flipper frame 24 and a diverting surface 26 supported by flipper frame 24. In the illustrated assembly, diverting surface 26 is a driven belt but other surfaces are possible, such as driven or non-driven rollers, or the like. Flipper actuator assembly 18 selectively concurrently actuates flipper assemblies 16 between a retracted or non-diverting position, in which arms 19 are adjacent conveying surface 14 and are located beyond edges of conveying surface 14, to an actuated or diverted position, shown in phantom in FIG. 2, in which diverting surfaces 26 of flipper assemblies 16 are generally collinear or coplanar and are aligned across conveying surface 14 to form a substantially continuous diverting surface. In the illustrated embodiment, diverting surfaces 26 are at an angle of approximately 45° with respect to the direction of travel of conveying surface 14 when arms 19 are pivoted to their diverting positions. However, they could extend anywhere from as low as 20° or less to up to 60° or more. The speed of belt 26 is related to the speed of conveying surface 14 according to the intercept angle of flippers 16 such that diverted articles maintain the same forward speed while being diverted. If this angle is 45°, then the speed of belt 26 is approximately 1.4 (forward speed divided by the cosine of 45°) times the speed of conveying surface 14.

Figure 6:
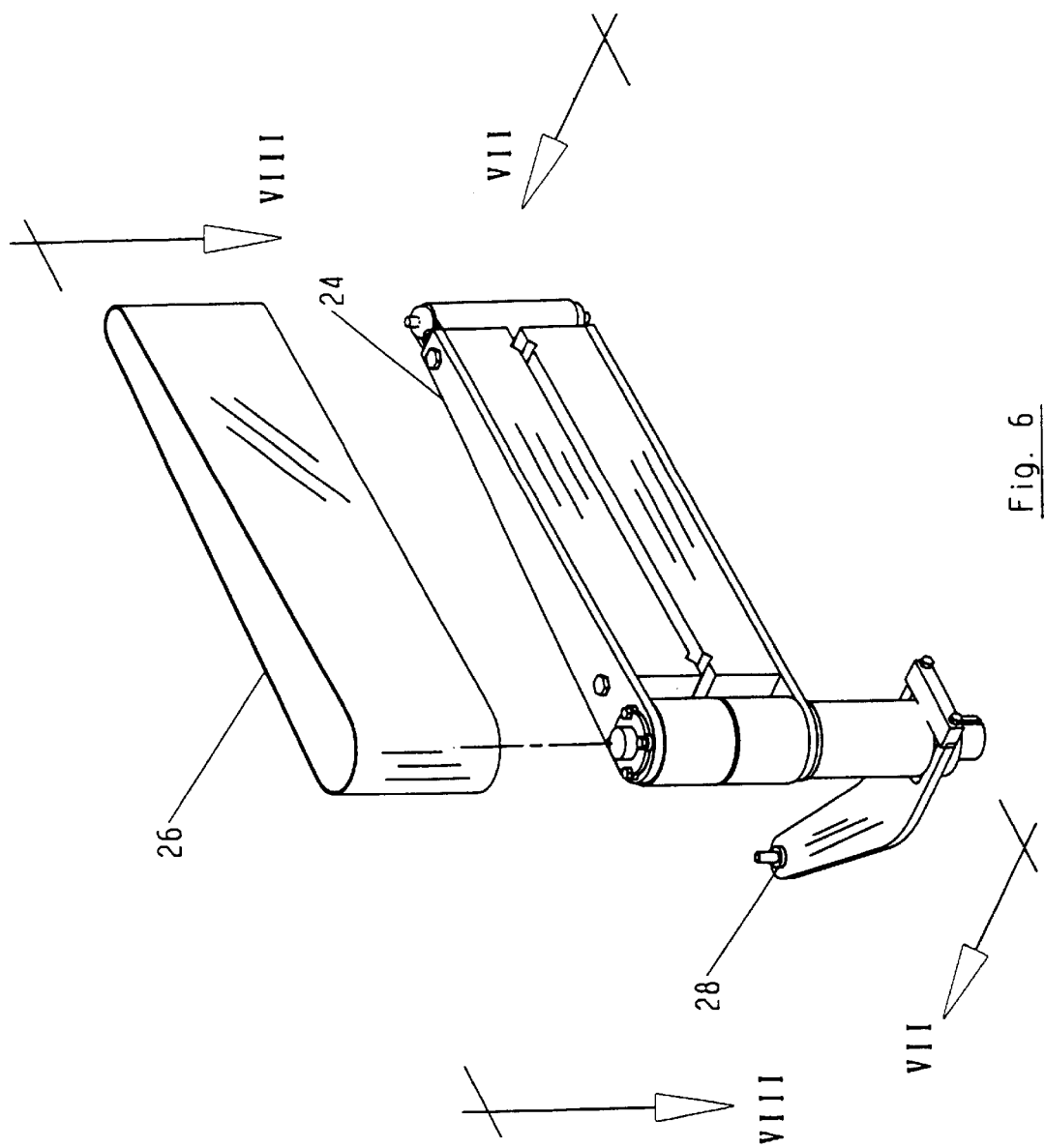
FIG. 6 is a perspective view of a flipper assembly.
Figure 7:
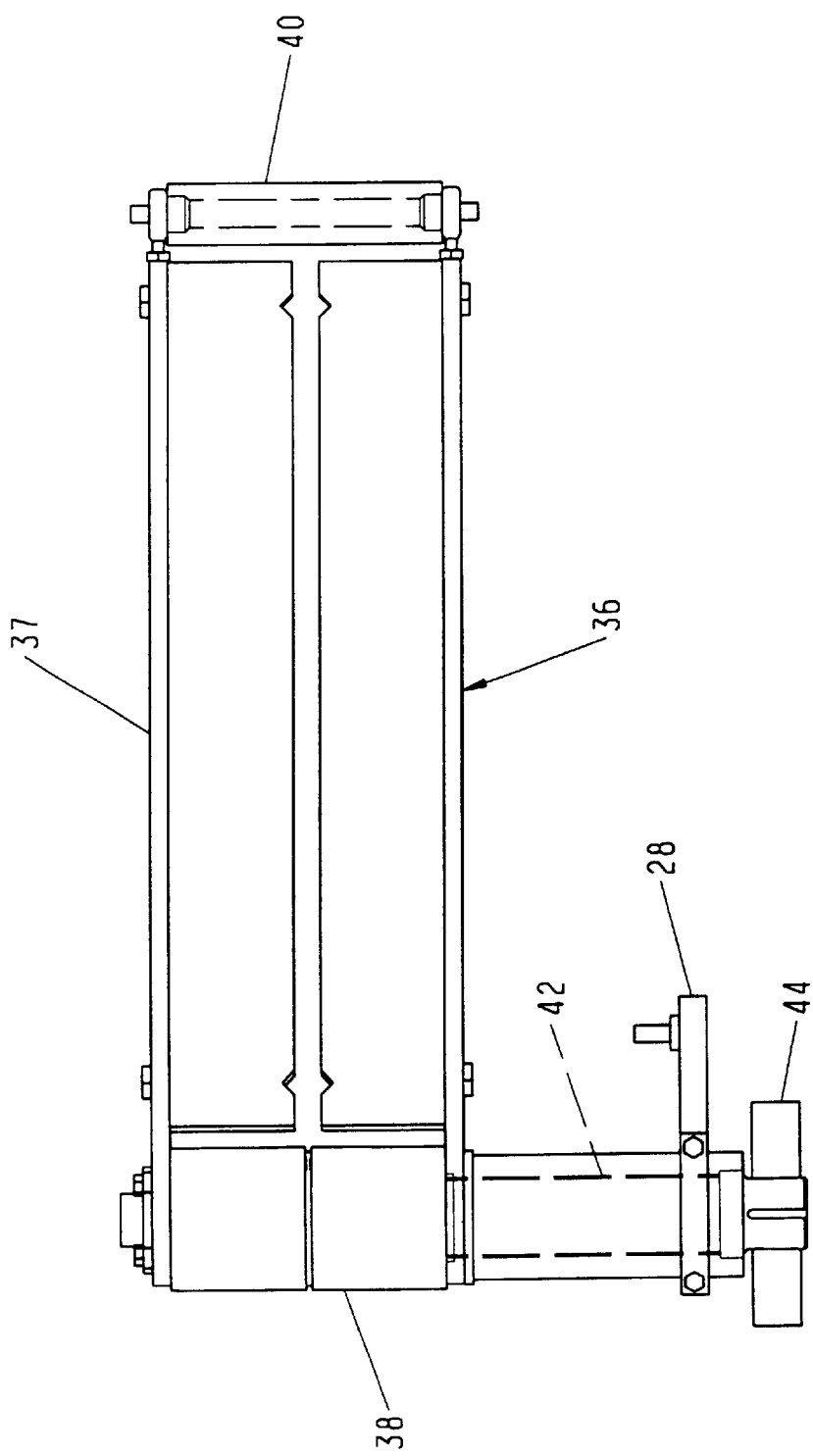
FIG. 7 is a side elevation taken from the view V—V in FIG. 6.

Flipper frame 24 includes a flipper weldment 36 made up of an arm 37 that supports a drive roller or pulley 38 and an idle roller or pulley 40. Extending downwardly from driver roller 38 is a drive shaft 42 (FIG. 6), which includes a sprocket or pulley 44 mounted thereon which engages or is engaged by a timing, or cog, belt (not shown) from a motor 30 and a gear reducer assembly 32 to thereby drive driver roller 38 and, in turn, belt 26.

Figure 8:
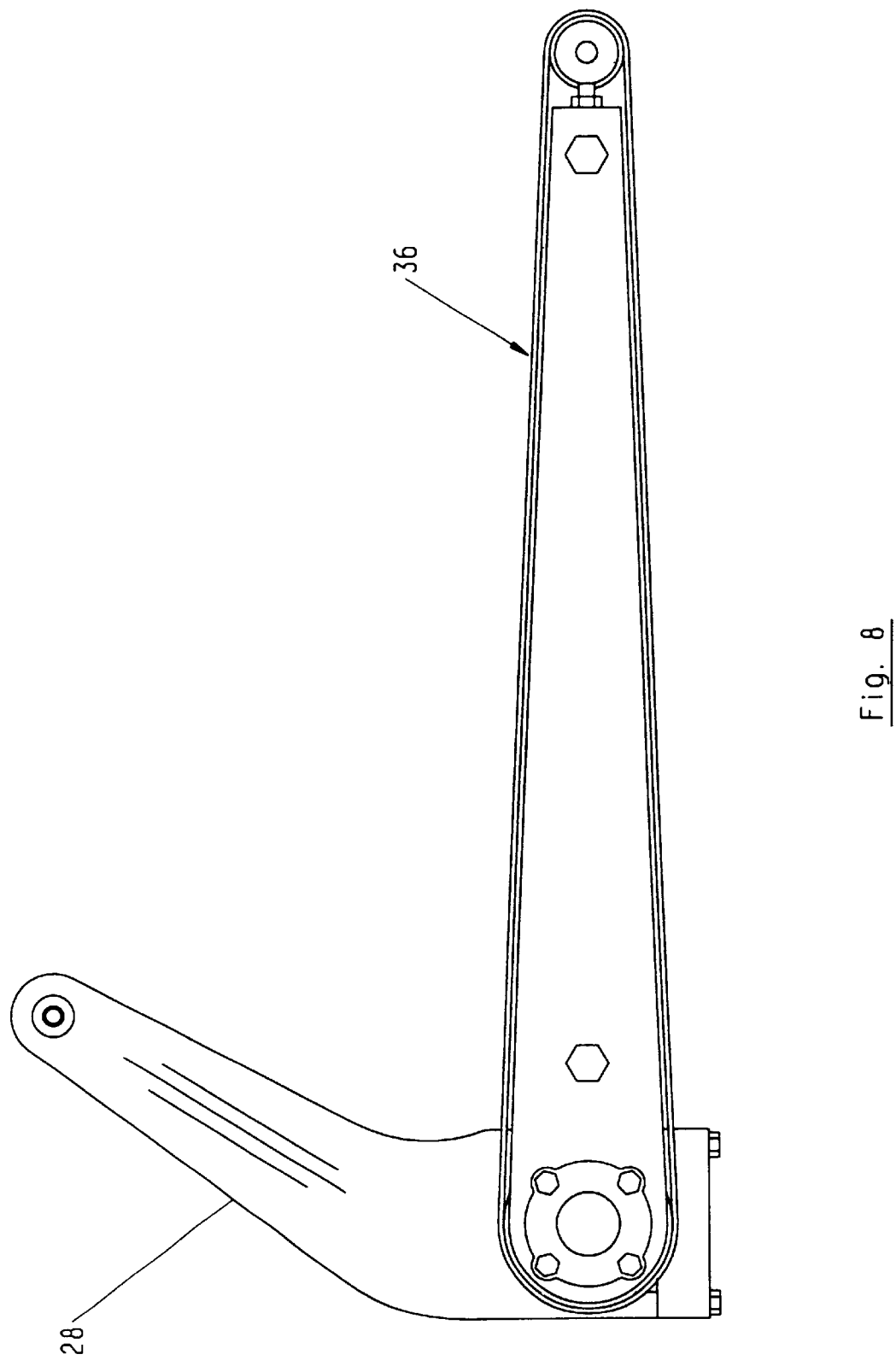
FIG. 8 is a top plan view taken from the view VI—VI in FIG. 6.
Figure 9:
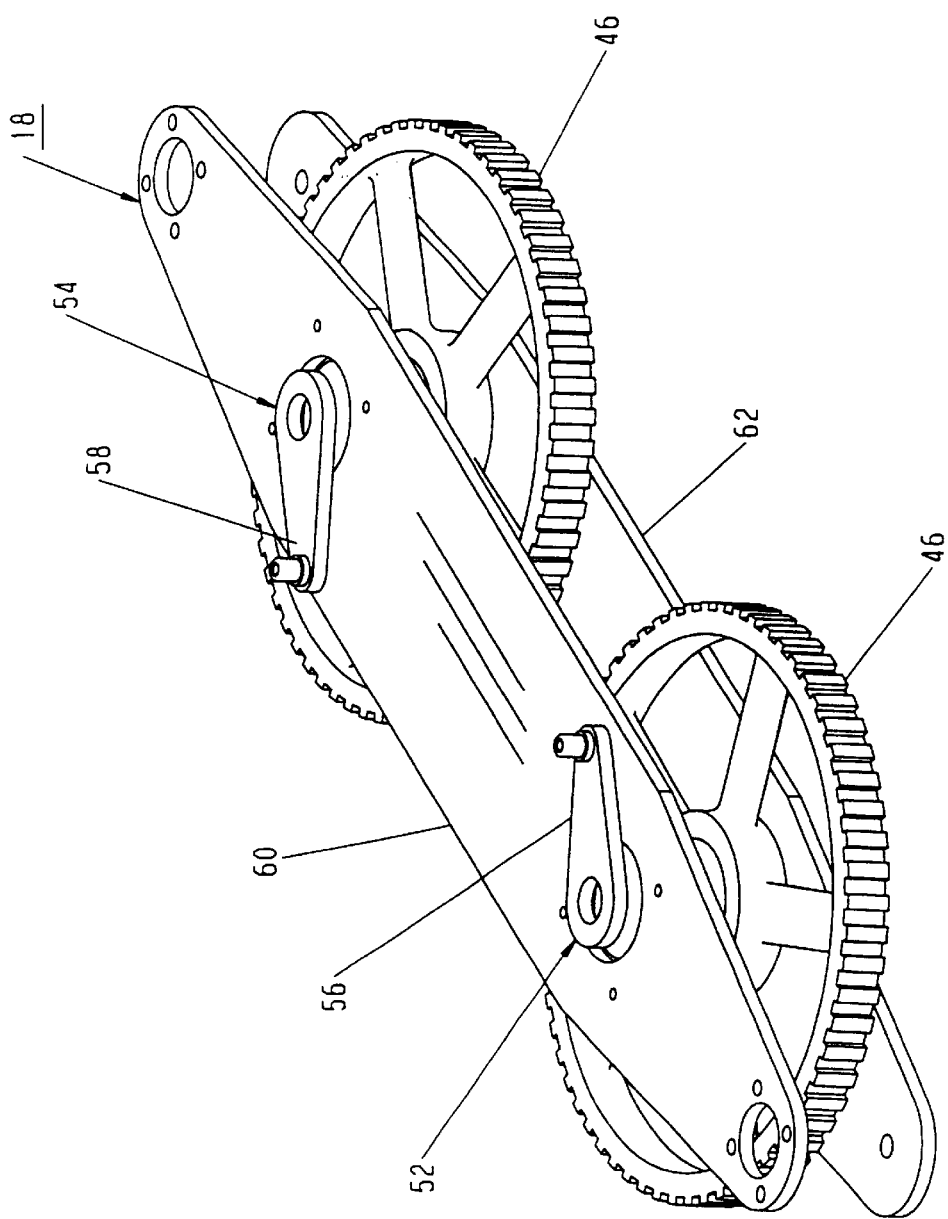
FIG. 9 is a perspective view of a flipper actuator assembly.
Figure 10:
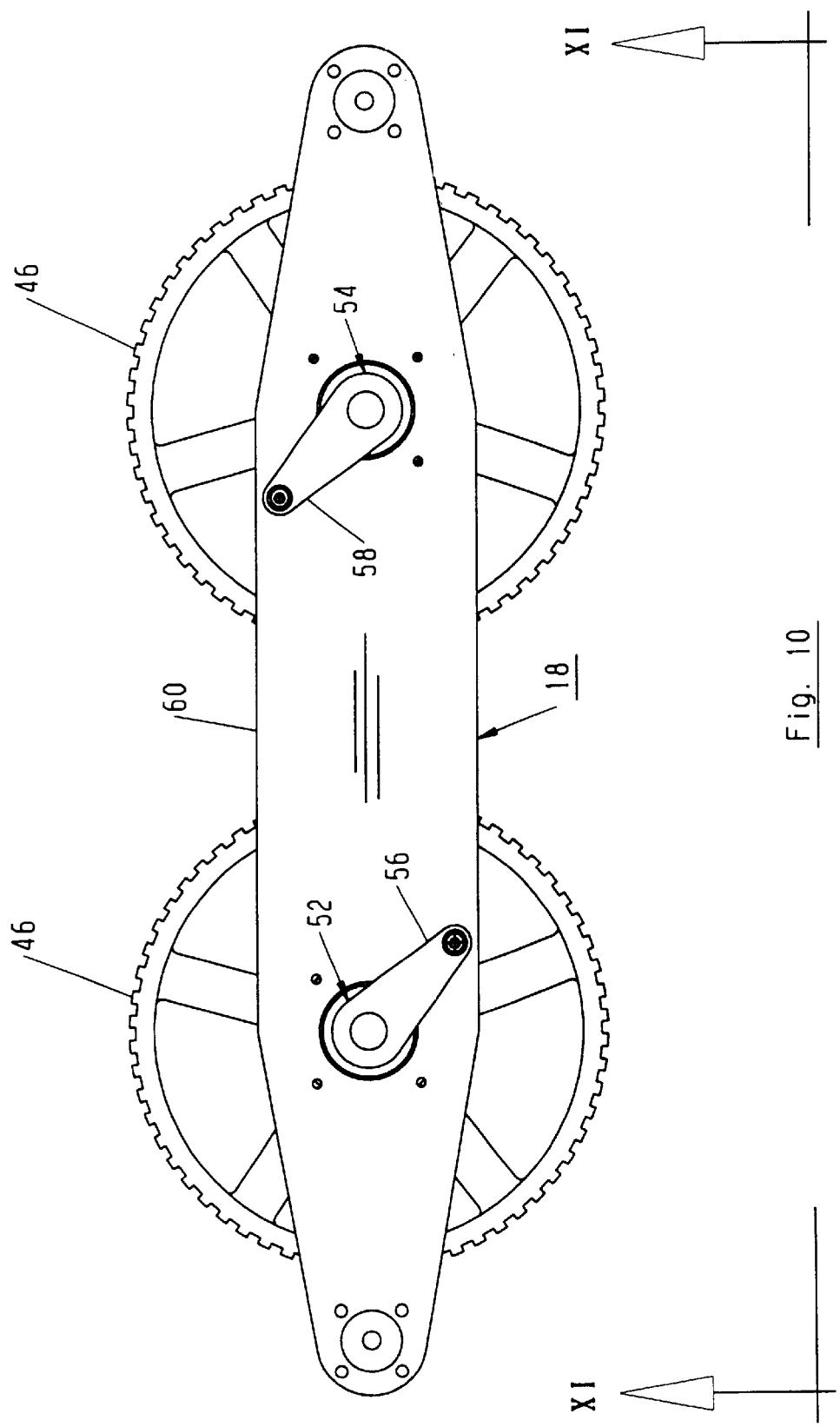
FIG. 10 is a top plan view of the assembly in FIG. 9.

A flipper actuator lever 28, when actuated, rotates flipper frame 24 between a retracted position and an actuated position. Flipper actuator lever 28 is selectively actuated by flipper actuator assembly 18. Flipper actuator assembly 18 includes a pair of flipper drive pulleys 46 (FIG. 8) which are continuously driven by the same timing belt, which drives pulley 38 from motor 30. A crank shaft assembly 52, 54 is selectively connectable with a respective drive pulley 46 by an electromechanical clutch assembly 48, 50. When the clutch assemblies are actuated in order to initiate a divert, each crank shaft assembly 52, 54 is rotated 180° from the rotation of its respective flipper drive pulley 46. This causes a respective crank plate 56, 58 to also rotate 180°. This motion is transferred to flipper actuation lever 28 by a respective connecting rod 34. For each 180° rotation of crank shaft assembly, flipper assembly 16 is rotated 45°. When the clutch assemblies 48, 50 are again actuated in order to retract the flipper assemblies, crank plates 56, 58 are rotated another 180° in the same direction as before, which causes flipper assemblies to rotate 45° in the opposite direction. In the illustrated embodiment, clutch assemblies 48, 50 are commercially available and marketed by Warner Spring Brake under Model CB7. The clutches are electrically actuated to extend flipper assemblies 16 by a control circuit (not shown) in response to an article to be diverted being detected in proximity to diverter assembly 10 and are, again, actuated by the control circuit to retract flipper assemblies 16 when the article is detected being received in the take-away conveyor or chute (not shown).

Advantageously, the present invention extends below the conveying surface by no more than 18 inches and preferably no more than 12 inches. This is desirable for overhead applications to provide maximum clearance under the diverter assembly. The present invention also provides for the majority of the actuation drive assembly to be located beneath the conveyor with minimal lateral extension beyond the width of the conveying surfaces. This reduces the footprint of the diverter assembly, which is especially desirable for floor level installations.

In the illustrated embodiment, divert speeds of up to 40 articles per minute, preferably 60 articles per minute, and most preferably 80 articles per minute are obtained when conveyor surface 14 is operated at 350 feet per minute. Although the invention is illustrated with separate clutches for each paddle assembly, which are electrically operated substantially in unison, it would be possible to mechanically link the paddle assemblies together and operate them from a single clutch assembly.

Figure 11:
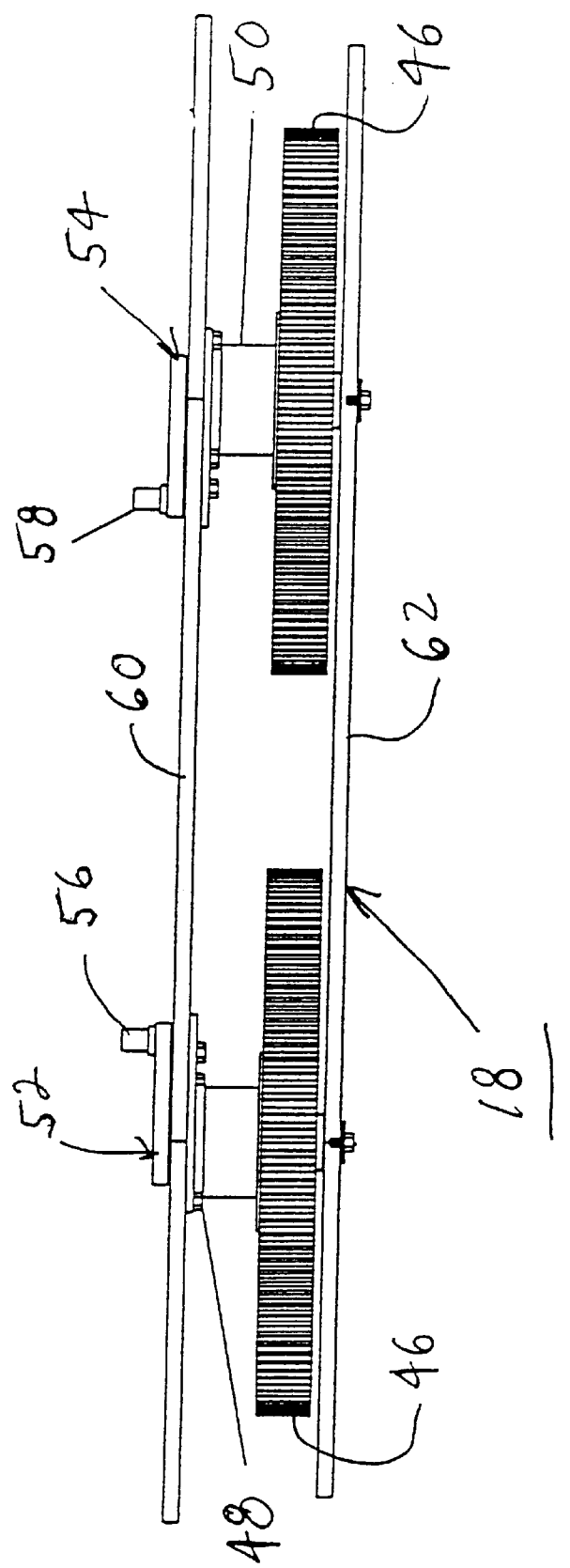
FIG. 11 is a side elevation taken from the view XI—XI in FIG. 10.
Figure 12:
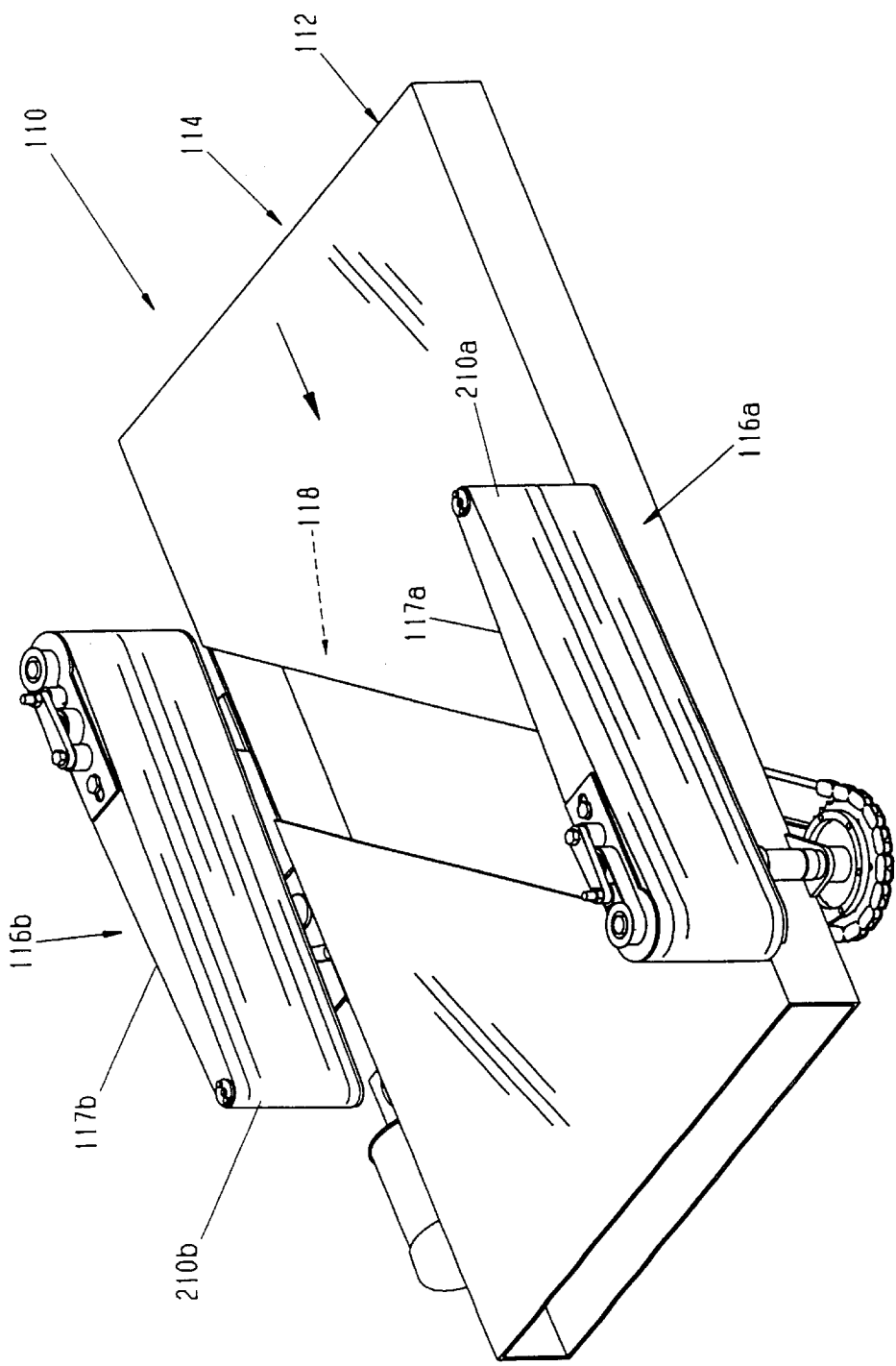
FIG. 12 is a perspective view of another embodiment of a high-speed diverter assembly of the present invention.
Figure 13B:
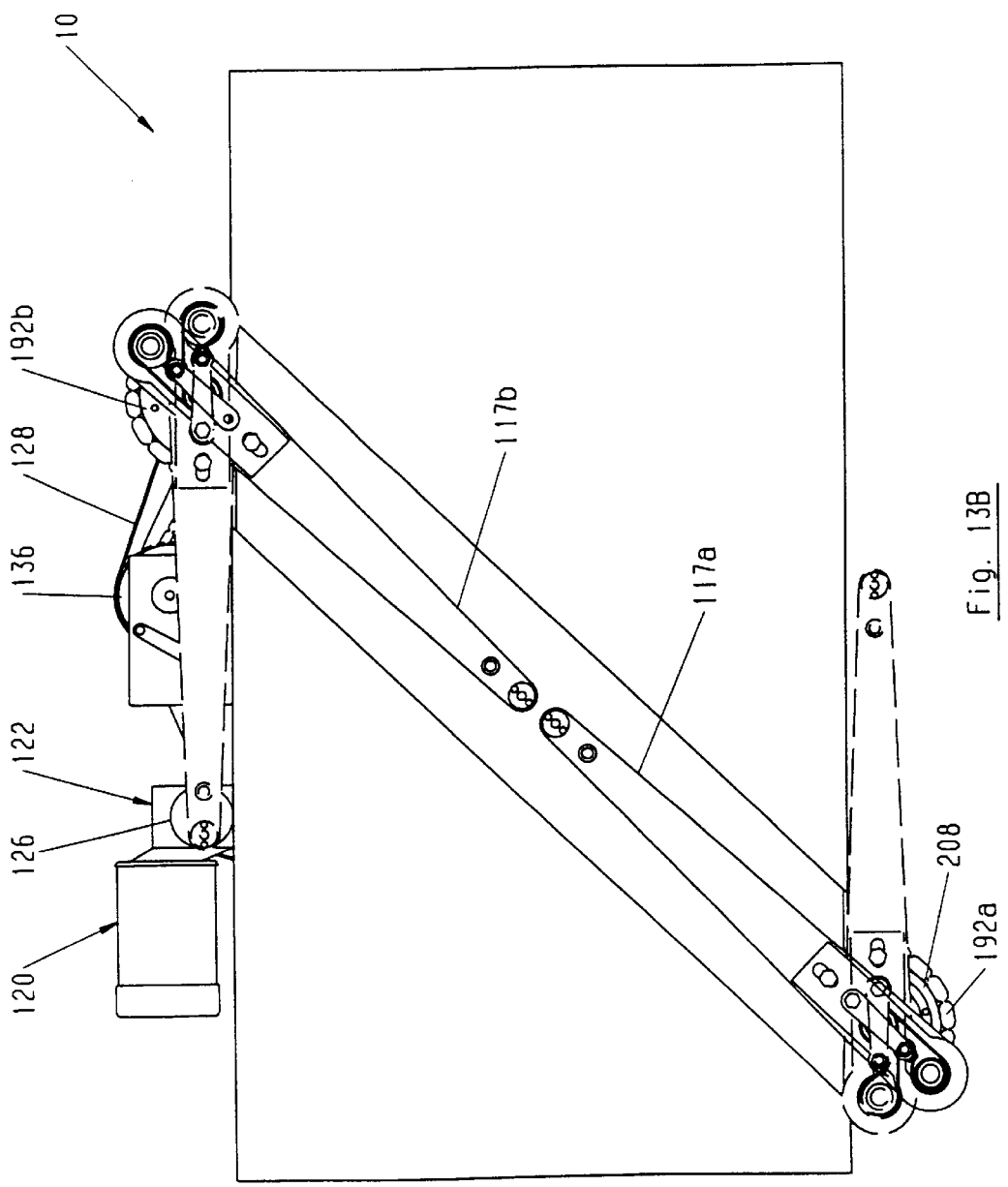
FIG. 13B is a view similar to FIG. 13A illustrating the flipper assembly arms in a diverting position.

Referring to FIGS. 11–13, the numeral 110 generally designates a second embodiment of a diverter assembly of the present invention which is particularly suitable for high-speed applications. High-speed diverter assembly 110 includes a frame or bed 112, which forms a generally horizontal conveying section 114, a controller 115, a pair of flipper assemblies 116a and 116b, and a drive assembly 118, which is actuated by controller 115 similar to the previous embodiment. As best understood from FIG. 1, high-speed diverter assembly 110 is typically positioned between inline conveyor sections C1 and C2 and is used to redirect the flow of articles from the conveying direction of conveyor sections C1 and C2, which flows between conveyor sections C1 and C2, to a take-away conveyor section C3. In the illustrated embodiments, take-away conveyor section C3 is angled approximately 45° with respect to the conveying direction to define a transfer direction, which is approximately 45° with respect to the conveying direction. It should be understood that the transfer direction, however, may be varied and may be angled with respect to the conveying direction, for example, from an angle as low as 20° or less or up to 60° or more. However, for ease of reference, the remaining description will refer to the angular orientation of the transfer direction being approximately 45°.

Figure 14:
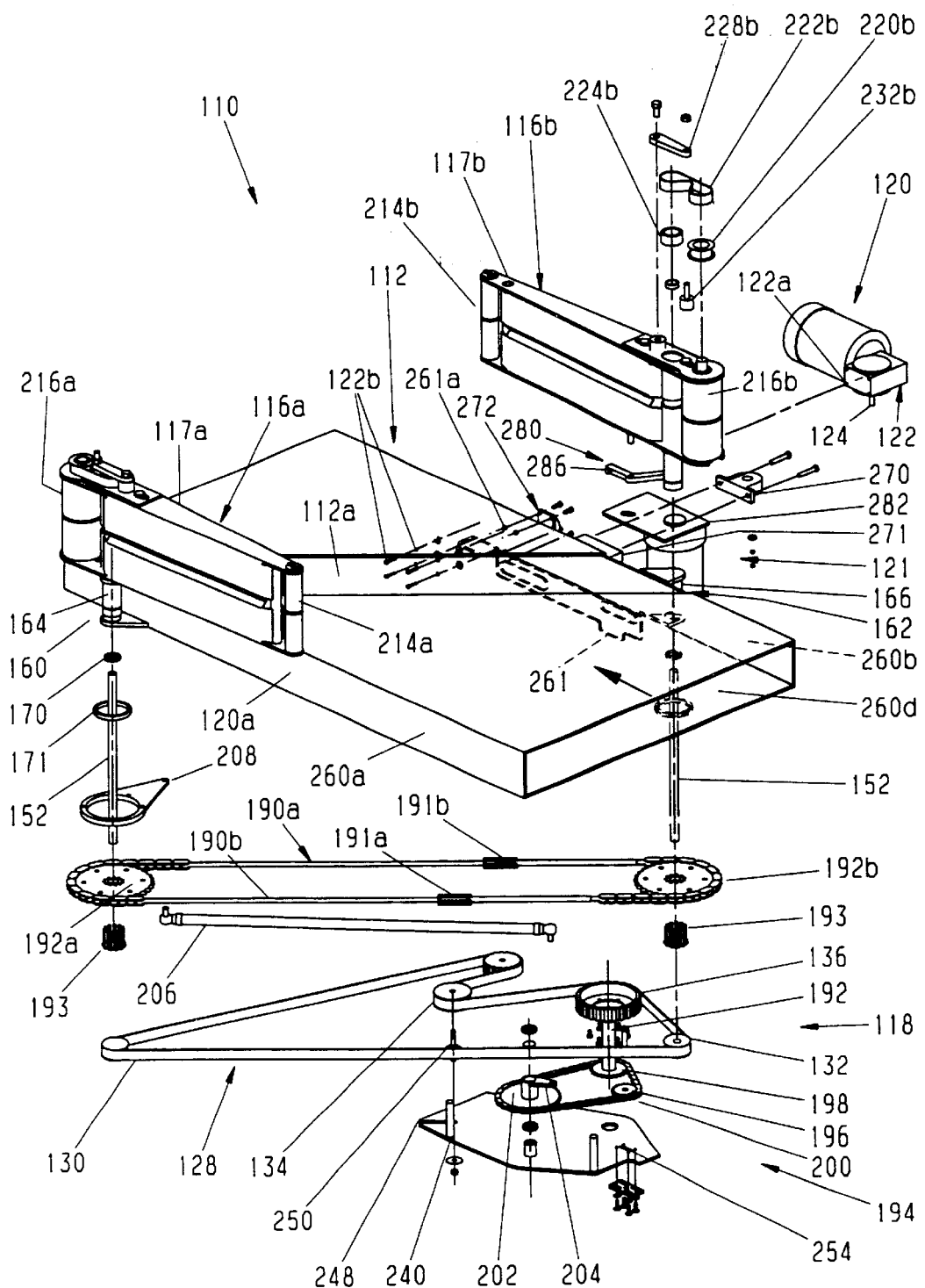
FIG. 14 is an exploded perspective view of the diverter assembly of FIG. 12.

In order to divert articles from the conveying direction to the transfer direction, flipper assemblies 116a and 116b are actuated to pivot arms 117a and 117b about their respective pivot axes 116c and 116d so that arms 117a and 117b are moved from their home or non-diverting position (shown in FIG. 12) adjacent conveying surface 114 to a diverting position in which at least a portion of the arms 117a and 117b of flipper assemblies 116a and 116b extend over conveying surface 114 and are preferably generally aligned (see FIG. 13B), as will be more fully described below. As best seen in FIG. 14, frame or bed 112 is adapted so that its conveying surface will lower at arms 117a and 117b to permit an article caught between arms 117a and 117b and bed 112 to be released. For example, in the illustrated embodiment, frame 112 includes a detent or recess 112a in the upper surface of bed 112 which is generally aligned under arms 117a and 117b when they are moved to their diverting positions. Detent 112a will permit the conveying belt, which moves across the upper surface of bed 112 and which defines conveying surface 114a, to drop down should an article get snagged under arm 117a or 117b. When the belt drops down, the article will be released.

When extended across conveying section 114, arms 117a and 117b generally align such that their upstream facing surfaces 117a' and 117b' form a substantially continuous fence or diverting surface. In addition, the distal ends of arms 117a and 117b are substantially adjacent so that there is little or essentially no space between the ends of arms 117a and 117b. When in their home positions, arms 117a and 117b are aligned adjacent conveying section 114 and are positioned outboard of the conveyor section sides 120a, 120b so as to not interfere with the flow of articles along conveying section 114.

As best understood from FIGS. 13A and 14, arms 117a and 117b are moved between their home or non-diverting positions and diverting positions by drive assembly 118, which is located generally beneath and adjacent one side of conveying section 114. Drive assembly 118 includes a motor 120 and a clutch brake assembly 121, with a plurality of linkages which together with clutch assembly 121 transform the drive motion of motor 120 into selective rotary motion of arms 117a and 117b and rotary motion of the belts of arms 117a and 117b, which will be more fully described below.

In the illustrated embodiment, motor 120 includes a reduction gear box 122 with a gear box drive shaft 124, on which a timing belt sprocket 126 is mounted. Motor 120 may comprise a one horsepower motor, with gear box 122 comprising a 5:1 ratio gear box reducer. Sprocket 126 drives a belt 128, such as a timing belt or cog belt. Belt 128 forms a closed path and is coupled to the respective flipper assemblies 116a and 116b by timing belt sprockets 130 and 132. Belt 128 is directed around its path around timing belt sprockets 126, 130, and 132 by a belt idler timing belt sprocket 134 and a belt support sprocket 136.

Referring now to FIGS. 14 and 17–22, each arm 117a and 117b includes a frame 138 formed from an upper plate member 140 and a lower plate member 142 and a pair of intermediate belt support plate members 144 and 146. Extending from upper plate member 140 through lower plate member 142 is a bearing housing 148. Bearing housing 148 comprises a tubular or cylindrical body and includes a transverse passage 150 for receiving a drive shaft 152, which is journaled in bearing housing 148 by a bearing 170. As will be more fully described below, shaft 152 is driven by belt 128 to drive the belts of the respective flipper assemblies 116a and 116b.

Figure 15:
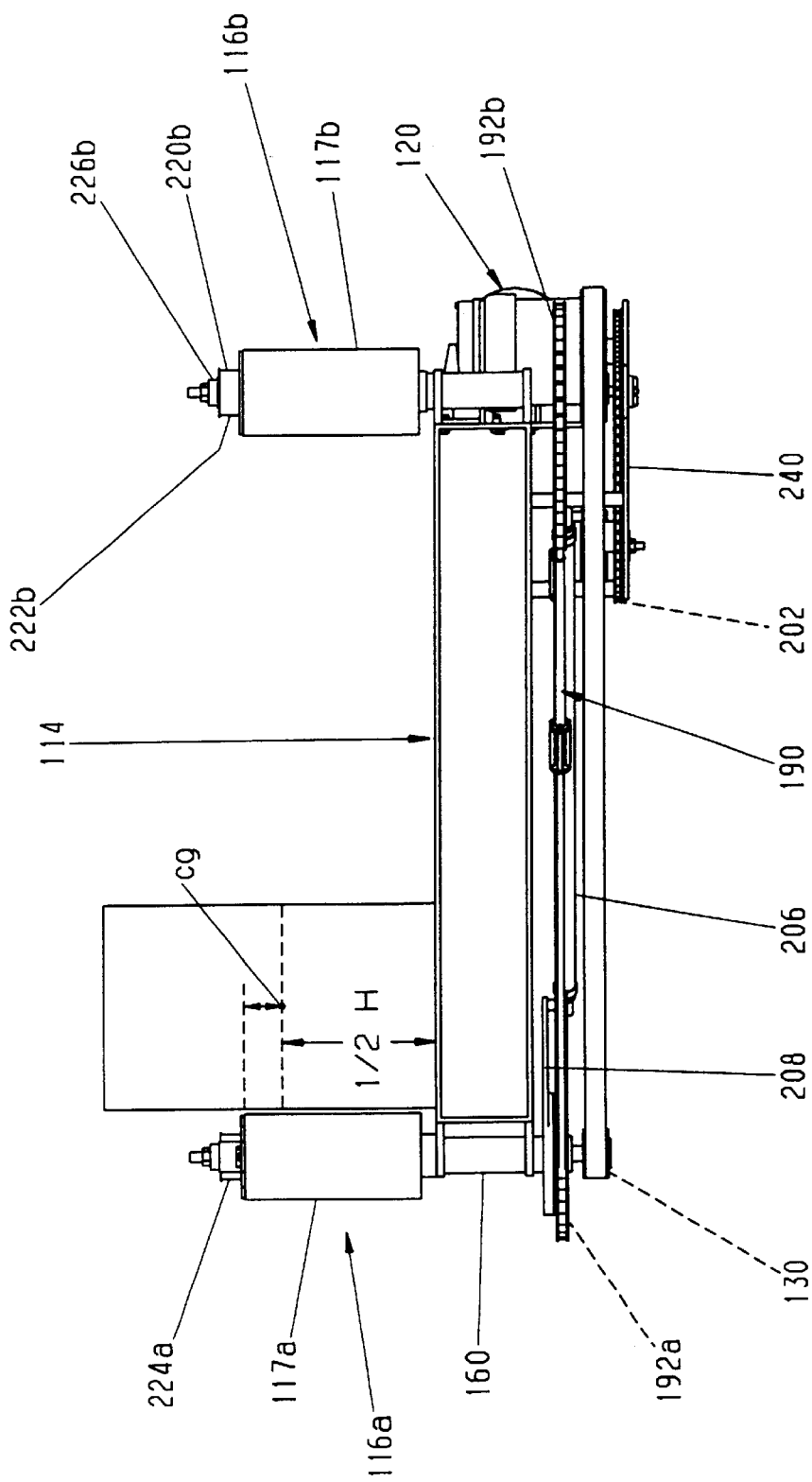
FIG. 15 is an end elevation view of the diverter assembly of FIGS. 12 and 13A.

Extending between upper plate 140 and lower plate 142 is a tubular member 154. Tubular member 154 is mounted at its opposed ends to upper plate member 140 and lower plate member 142, for example by welding. Intermediate plate members 144 and 146 are respectively welded to upper plate members 140 and 142 and, further, to tubular member 154 and bearing housing 150 to provide a bed or support for its respective belt. As best seen in FIG. 22, intermediate plate members 144 and 146 include a plurality of mounting flanges 144a and 146a which are welded to tubular member 154 and bearing housing 148 to thereby form a rigid flipper frame 138. Frame 138 may be adjusted as needed but typically is at least 12 inches high for baggage diverting applications. In this manner, as best seen in FIG. 15, arms 117a and 117b will contact most baggage above their centroids or center-of-gravity (cg) or at least at or above the mid-height of the luggage (½H) thereby minimizing the risk of the baggage toppling over arms 117a and 117b. Optionally, frame 138 is formed from a lightweight but rigid material, such as a lightweight metal, including aluminum. In addition, plates 144 and 146 include grooves 144a', 146a' at their respective medial portions to help retain the driven belts on arms 117a and 117b.

Flipper assemblies 116a and 116b are mounted to the frame or bed 112 of conveying section 114 in mounting collars 160 and 162. Mounting collars 160 and 162 comprise tubular members 164 and 166, which are mounted to sides 120a and 120b of frame 112, for example by welding. Lower portions 168 of bearing housings 148 extend into tubular members 164 and 166 and are journaled therein by bearings 171 to thereby pivotally mount arms 117a and 117b to frame 112. In this manner, when actuated, arms 117a and 117b pivot about the central, vertical axes of mounting collars 160 and 162 which define their respective pivot axes 116c and 116d.

Referring again to FIG. 14, drive shaft 152 extends into bearing housing 148 and is journaled in upper plate member 140 by bearing 170. Mounted to lower end of bearing housing 148 is a shaft stabilizer 172 through which drive shaft 152 extends and in which drive shaft 152 is journaled. Arms 117a and 117b are drivingly coupled to each other by a chain assembly 190, with arm 117b comprising a driver arm that is selectively drivingly coupled to drive assembly 118 by clutch assembly 121, described more fully below. Chain assembly 190 is coupled to flipper assemblies 116a and 116b by sprockets 192a and 192b which are journaled on drive shafts 152 but mounted to shaft stabilizers 172 (which are mounted in bearing housing 148) by fasteners 193. Fasteners 193 extend through a plurality of mounting openings in sprockets 192a and 192b and into a corresponding plurality of threaded openings in shaft stabilizers 172 to thereby drivingly couple sprockets 192a and 192b to bearing housings 148 of arms 117a and 117b. In this manner, when sprockets 192a and 192b rotate, arms 117a and 117b pivot about their respective pivot axes 116c and 116d.

As noted above, drive assembly 118 includes clutch assembly 121. Clutch assembly 121 is actuated to initiate the rotation of arms 117a, 117b or actuation of flipper assemblies 116a, 116b. Although belt 128 is continuously driven when motor 120 is running, arms 117a, 117b do not pivot until clutch assembly 121 is actuated. Clutch assembly 121 is electrically actuated by controller 115, for example, in response to an article (that is to be diverted) being detected in proximity to diverter assembly 110. Similarly, clutch assembly 121 is actuated to retract arms 117a and 117b when the article that is diverted is detected as being received by the take-away conveyor or chute C3. If more than one article is to be diverted, then clutch assembly 121 is actuated when the last article that is to be diverted is received by the take-away conveyor.

Referring again to FIG. 14, extending through belt sprocket 136 is a clutch shaft 192 which is drivingly coupled on one end to the clutch assembly 121 and on its other end to a drive transfer assembly 194. Drive transfer assembly 194 includes a drive chain 196 and a plurality of sprockets 198, 200, and 202 around which drive chain 196 extends and forms a closed loop. Clutch shaft 192 is drivingly coupled to sprocket 198. Therefore, when clutch assembly 121 is actuated, clutch shaft 192 rotates sprocket 198, which in turn drives chain 196 around sprockets 200 and 202. Sprocket 202 includes a cam member 204, which couples to a tie rod 206, which in turn couples to a second cam member 208, which is mounted to sprocket 192a. In this manner, when clutch assembly 121 is actuated, clutch shaft 192 will drive sprocket 198, which in turn will drive sprocket 202 to rotate cam member 204. As cam member 204 rotates, tie rod 206 pulls or pushes on cam member 208 to rotate sprocket 192a. Since sprocket 192a is mounted to bearing housing 148 of arm 117a, arm 117a will pivot about its pivot axis 116c. As noted previously, sprocket 192a is drivingly coupled to sprocket 192b, which is similarly mounted to bearing housing 148 of flipper assembly 116b. In this manner, when clutch assembly 121 is actuated, chain 190 will transform rotational movement of arm 117a into rotational movement of arm 117b such that arms 117a and 117b will move generally simultaneously and, further, both in a counter-clockwise direction (as viewed in FIG. 14) to thereby cause arms 117a and 117b to extend across conveying surface 114a (FIG. 1) of conveyor section 114. Further, arms 117a and 117b will be moved until they align along a transverse axis extending across conveying surface 114a, which in the illustrated embodiment forms approximately a 45° angle with respect to the conveying direction of conveyor sections C1 and C2.

Clutch assembly 121 preferably comprises a clutch brake unit Model CB10 available from Warner Spring Brake. In order to ease removal of articles jammed between arms 117a and 117b, the anti-backlash spring of clutch assembly 121 is optionally removed. In this manner, if an article is jammed between the arms, the flipper assemblies may be manually backed off the article to remove the article. In addition, controller 115 includes two detectors 115a, 115b, such as proximity detectors, for detecting whether there is a jam or a malfunction. Detectors 115a, 115b are mounted to cylindrical collar 166 by mounting plates 166a and 166b (FIG. 13A) and are positioned so that when arms 117a and 117b are in their home position, proximity detector 115b will be aligned with an opening 115d in sprocket 192b. When arms 117a and 117b are moved to their diverting position, proximity detector 115a aligns with a second opening 115c in sprocket 192b. In this manner, detectors 115a and 115b can be used to detect whether arms 117a and 117b are not properly rotated, for example because they are blocked or a malfunction has occurred. Controller 115 is in communication with detectors 115a and 115b and is adapted to shut down the drive assembly when it detects (through detectors 115a or 115b) that a jam or malfunction has occurred. The occurrence of a jam or malfunction is determined when the relevant proximities detector does not detect the opening. For example, when in the home position, proximity detector 115b should detect opening 115d. If controller 115 does not receive the appropriate signal from detector 115b, the controller 115 will shut down the drive assembly. Similarly, when controller 115 has moved arms 117a and 117b to their diverting position and proximity detector 115a does not detect second opening 115c, then controller 115 detects that a jam or malfunction has occurred.

Each flipper assembly 116a, 116b includes driven diverting surfaces 210a and 210b. In this manner and as will be more fully described below, when an article makes contact with one or both arms, the articles forward motion will not be significantly, if at all, reduced and, instead, will be redirected in the transfer direction. In the illustrated embodiment, diverting surfaces 210a and 210b comprise closed loop belts 212a and 212b, respectively, which extend around the horizontal extents of arms 117a and 117b. Though it can be appreciated that other conveying surfaces may be used, such as provided by rollers or the like. In addition, belts 210 and 210b extend over at least most, if not all, of the vertical extents of the respective arms 117a and 117b. As previously described, the vertical extents of arms 117a and 117b is preferably at least 12 inches.

Figure 16:
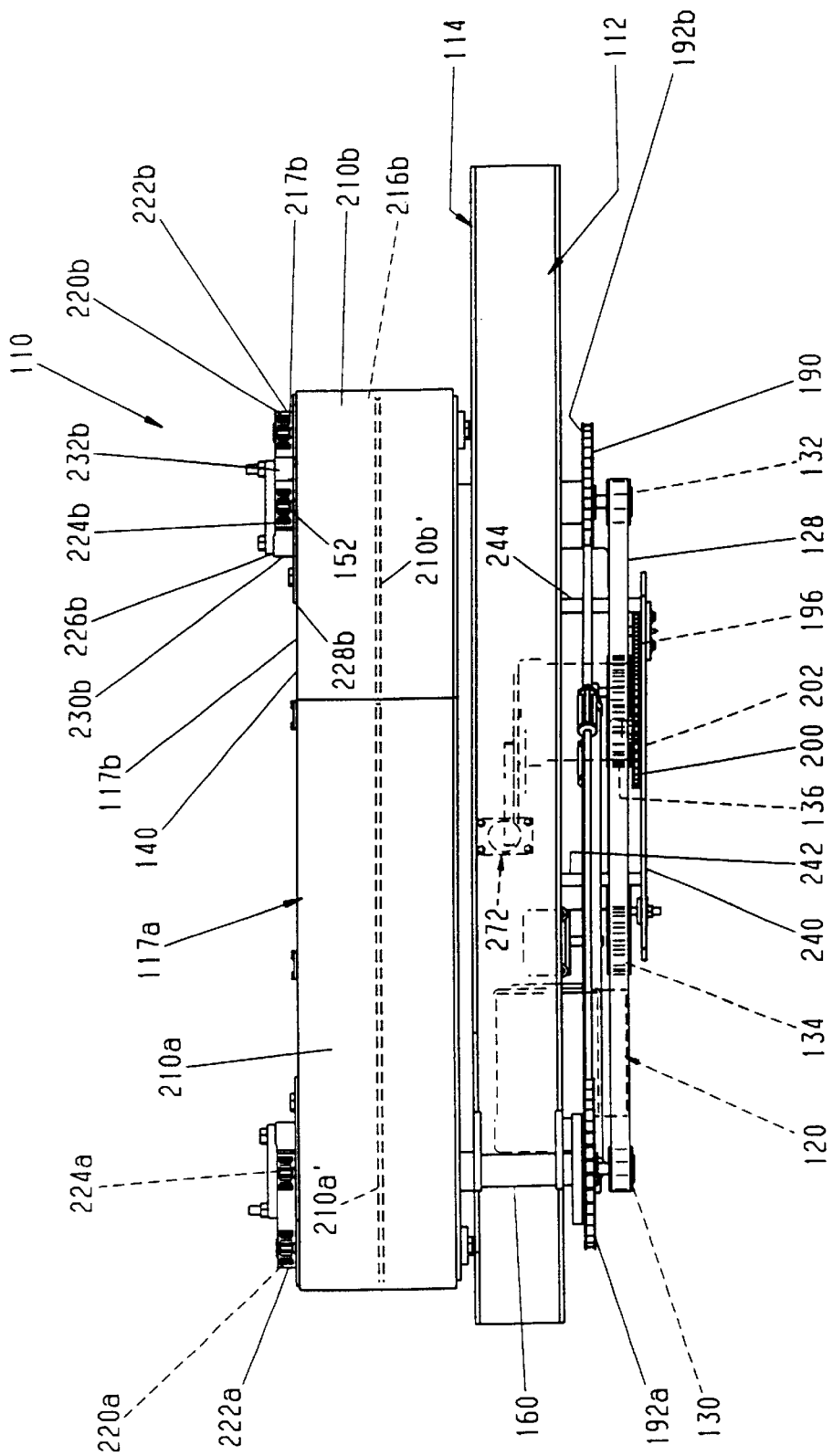
FIG. 16 is a side elevation view of the diverter assembly of FIGS. 12 and 13A.

Belts 212a and 212b comprise driven belts and are supported on arms 117a and 117b by a pair of rollers 214a, 214b, 216a, and 216b, respectively. Similar to belt support plates 144 and 146, rollers 214a, 214b, 216a, and 216b, include grooves 214a', 214b', 216a', and 216b', respectively, which are used to assist in retaining belts 210a and 210b and arms 117a and 117b. As best seen in FIG. 16, belts 210a and 210b include a projecting rib or flange 210a' and 210b', respectively, which are guided in respective grooves 144a', 146a', 214a', 216a', 214b' and 216b' to thereby retain belts 210a and 210b on arms 117a and 117b.

Rollers 214a, 214b comprise idler rollers and are mounted between upper plate member 140 and lower plate member 142 of the respective flipper assembly. Idler rollers 214a and 214b are preferably provided at the distal end portion of the respective arm. Rollers 216a, 216b comprise belt drive rollers and are driven by driver assembly 118 about belt axes spaced outwardly from pivot axes 116c and 116d. In this manner, when arms 117a and 117b are pivoted about their respective axes 116c and 116d an end portion of each arm will project over the edge of conveyor section, with the end portion of arm 117a providing a "bridge" between diverter assembly 110 and conveyor section C3. In this manner, when an article is diverted onto conveyor section C3, if there is a gap between conveyor section C3, arm 117a will continue to provide a driven diverting surface until the article is deposited on conveyor section C3 and its conveying surface takes over as the driving element for the article. In other words, the article will be under a substantially constant driving force which increases the flow of the article through the conveyor system. The remaining description of the belt drive assembly will be made in reference to flipper assembly 116b; however, it should be understood that the corresponding component of flipper assembly 116a are similarly numbered by with their numerals followed by an "a" rather than a "b". As best seen in FIGS. 14 and 16, mounted to shaft 217b of roller 216b is a belt sprocket 220b. As best seen in FIG. 14, belt sprocket 220b is coupled to shaft 152 of flipper assembly 116b by a belt 222b and a sprocket 224b, which is mounted on shaft 152. In this manner, when shafts 152 rotate about their respective axes, belts 222a and 222b drive driver rollers 216a and 216b, which in turn drive belts 210a and 210b about the horizontal extents of arms 117a and 117b.

In order to retain belt 222b on sprockets 220b and 224b, flipper assembly 116b includes a belt cover 226b which is releasably fastened to upper plate member 140 by a mounting plate 228b. Mounting plate 228b includes a cover support 230b and a pair of openings through which shaft 217b of roller 216b extends and through which shaft 152 extends to thereby receive mounted thereon sprockets 220b and 224b. Cover 226b also supports a cam follower 232b which may be used to adjust the tension on belt 222b. As would be understood by those skilled in the art, belts 210a and 210b are, therefore, continuously driven by motor 120 when motor 120 is energized. Similar to the previous embodiment, belts 210a and 210b are driven at a speed so that their forward speed vector matches the forward motion of the article being conveyed on conveying surface 114a. Therefore, at the angular orientation shown in the illustrated embodiment, the speed of belts 210a and 210b is approximately 1.4 times the speed of the conveying surface (or the speed of the conveying surface divided by the cosine of the angle between the conveying direction and the transfer direction) so that the forward vector component of the belt equals the forward motion of the conveying surface.

Drive transfer assembly 194 is supported by a plate 240, which mounts to frame 120 by a pair of rod members 242 and 244 (FIG. 16). Plate 240 includes a slotted opening 248 on which sprocket 134 is mounted by a pin 250 (FIG. 14) which permits adjustment of the tension on belt 128. Similarly, plate 240 includes a second slotted opening 254 on which sprocket 200 is mounted to provide adjustment for the tension on chain 196. Adjustment for chain assembly 190 is provided by rod extensions 190a and 190b which include adjustable couplers 191a and 191b.

As best seen in FIG. 14, frame 112 comprises a boxed-shaped member which is formed by a plurality of side plates 260a and 260b and end plates 260c and 260d, which are interconnected, for example by welding. Frame 112 is typically supported by vertical supports or legs 265 so that is spaced above a support surface for aligning between conveyor section C1 and C2 and adjacent transfer conveyor section C3 (as shown in FIG. 1). In addition, frame 120 supports one or more belt rollers (not shown) for a closed loop belt (not shown) that provides a conveying surface and defines conveying surface 114a. However, it should be understood that the conveying surface may be provided by rollers or the like. Frame 120 also provides a mounting surface for a number of components of assembly 110. For example, clutch shaft 192 is journaled in a mounting bracket 270, such as a pillow block bearing mounting, which secures to the side of frame 112 by a mounting block and fasteners. Furthermore, side plate member 260b provides a mounting surface for a bearing member 272, which forms part of a torsion limiter for clutch brake assembly 121 described below. In addition, side frame member 260b provides a mounting surface for motor 120. As best understood from FIG. 14, mounted to side plate 260b is a motor mounting plate 261, which includes a plurality of mounting openings 216a. Gear box 122 includes a corresponding plurality of mounting openings 122a which receive fasteners 262b that extend through openings 261a to thereby secure motor 120 to frame 112 below flipper assembly 116b and below conveying surface 114a but to the side of frame 112. In this manner, the components of drive assembly 118 that are more likely to need maintenance or service are mounted to the side of frame 112, which provides easy access. In addition, the drive components are mounted to the side opposite from the transition side (the side which aligns with take-away conveyor). With the present configuration, therefore, the diverter assembly comprises a left-hand diverter. It should be understood that a right-hand diverter assembly would generally have a configuration that is a mirror-image of the configuration of the left-hand diverter assembly, though the same components may be used.

Figure 15A:
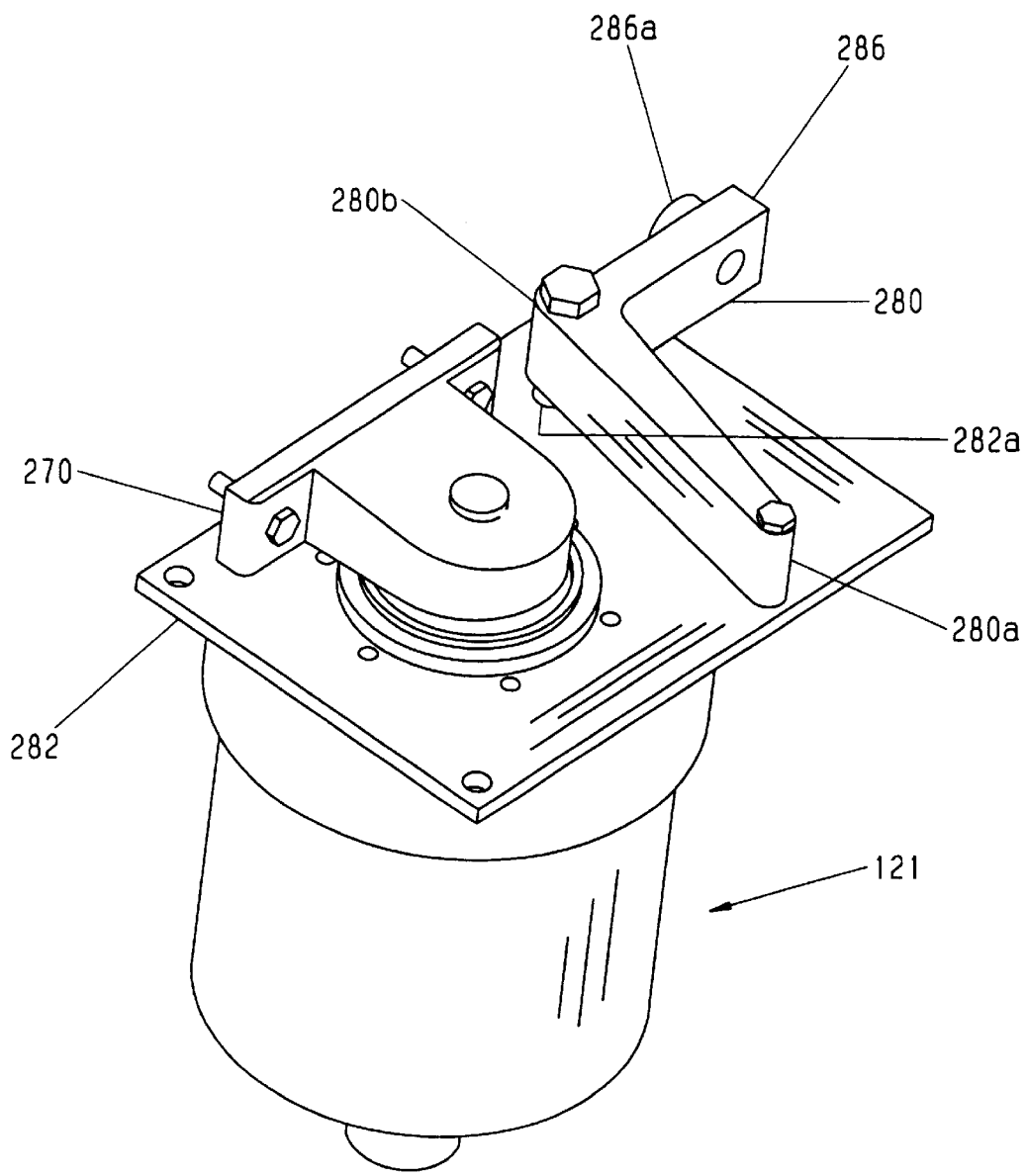
FIG. 15A is an enlarged perspective view of the clutch assembly of the diverter assembly of FIGS. 12–15.

Clutch assembly 121 is preferably mounted so that it is free to rotate over a limited range of motion when actuated. In order to dampen or limit the torque on clutch brake assembly 121, however, drive assembly 118 includes a clutch brake dampener 280 (FIG. 15A). Dampener 280 comprises an L-shaped arm pivotally mounted to the clutch brake mounting plate 282 at one end 280a and mounted at its elbow 280b to plate 282 in a slotted opening (FIG. 14). Free end 286 of dampener 280 includes a contact member 286a, such as an aluminum tube, which bears against a stop or dampener 272 when clutch assembly 121 is actuated. Preferably, dampener 272 comprises a rubber or neoprene material to absorb the impact from contact with arm 280, which dampens the rotation of the clutch assembly when clutch assembly 121 is actuated.

Similar to the previous embodiment, the power transfer components of drive assembly 118 are positioned below frame 112, with motor 120 and clutch 121 provided at a side of the frame 112 to provide easy access for replacement, repair, or adjustments. Furthermore, drive assembly 118 is compact and extends below frame 112 no more than 18 inches and, preferably, no more than 12 inches. Again, this provides for maximum clearance under diverter assembly 110.

Controller 115 preferably comprises a programmable logic controller (PLC) that is in communication, as noted above, with detectors 115a and 115b. In addition, controller 115 is in communication with at least one upstream detector, such as a proximity detector, which detects when an article that is to be diverted is approaching diverter assembly 110. When such an article approaches diverter assembly 110, the upstream detector generates a signal to controller 115 which in turn actuates clutch assembly 121 to pivot arms 117a and 117b to their diverting positions. When actuated, clutch assembly 121 performs a single 360° turn but through a 2:1 ratio so that cam or crank arm 204 rotates 180°, which translates into a 90° rotation of cam plate 208. Thus, when controller 115 receives a signal from the upstream detector that an article is approaching, diverter assembly 110, controller 115 transfers power to the solenoid clutch assembly 121 so that arms 117a and 117b will move simultaneously in a counter-clockwise direction to their diverting positions. In addition, controller 115 is in communication with a detector which detects when the article or articles to be diverted are diverted onto the take-away conveyor. In this manner, after the article or articles to be diverted is diverted on the take-away conveyor, controller 115 signals clutch assembly 121 to actuate a second single 360° turn that returns arms 117a and 117b to their home position. As a result, controller 115 actuates flipper assemblies 116a and 116b based on the gaps between the articles on conveying surface 114a. Therefore, diverter assembly 110 (and also diverter assembly 10) are unaffected by the sizes of the articles being diverted. The time of travel from start to finish (when arms 117a and 117b move from their home position to their diverting position), may be approximately 250 milliseconds. As would be appreciated by those skilled in the art, flipper assemblies 116a and 116b divert articles at a very high speed. As mentioned previously, with a main-line belt speed of 360 feet per minute diverter assembly 110 may achieve sortation rates of 60 articles or bags per minute, and in some cases 80 bags per minute. With smaller articles, such as articles having dimensions of less than one foot, the sortation speed can achieve upwards of 140 articles per minute.

Figure 24:
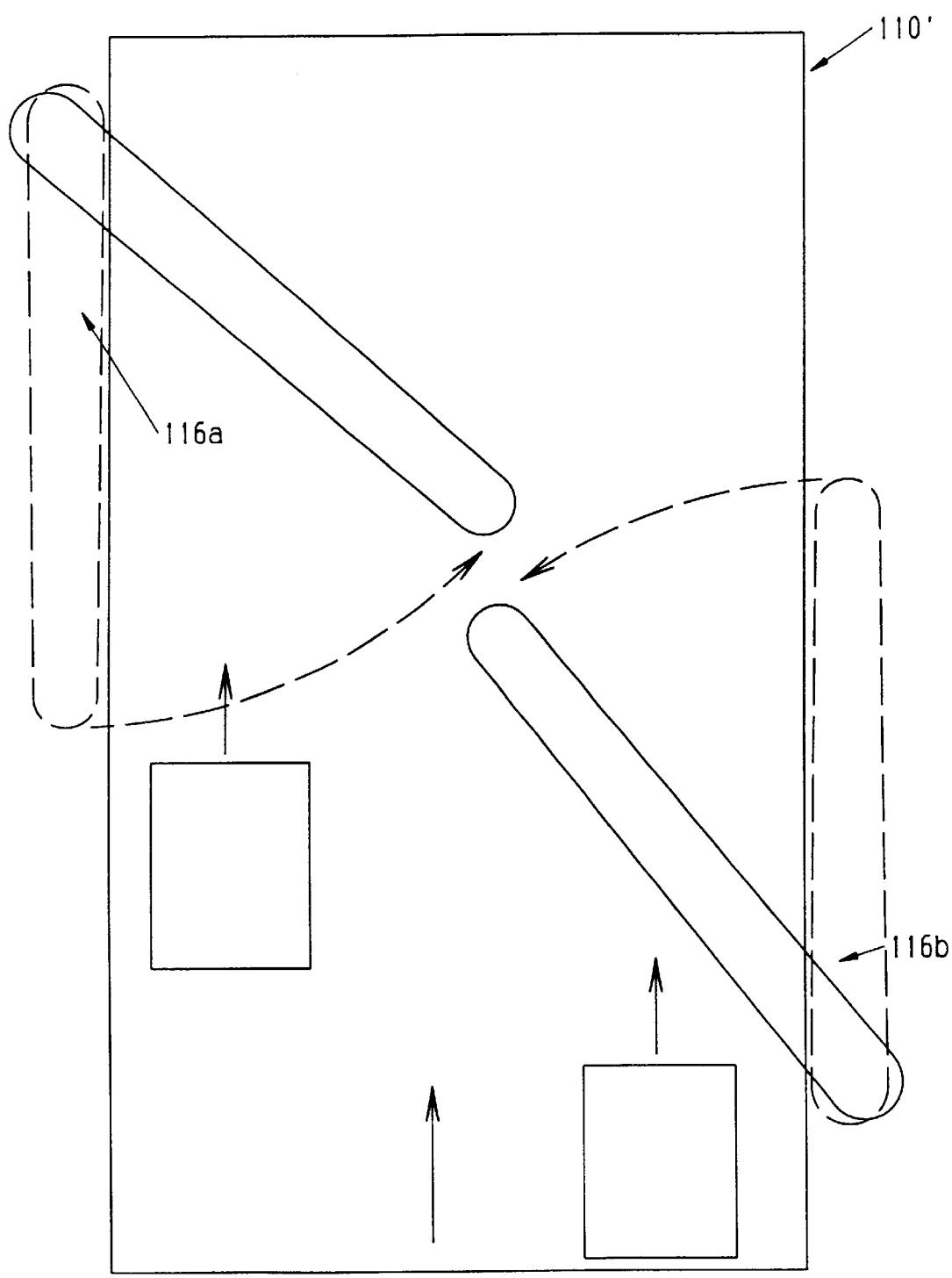
FIG. 24 is a schematic view of the diverter assembly of the present invention illustrating an article being conveyed on the conveying surface.

Referring to FIG. 24, when an article is conveyed on conveying surface 114a on the side close to arm 117b, it can be appreciated, that if the speed of the article approaches the response time of flipper assemblies 116a and 116b, the article will make contact with arm 117b at some point between rollers 124b and 126b, which will not adversely affect the diversion of the article. However, if an article is traveling down the middle of the conveying surface 114a or the side close to arm 117a, and the speed of the article exceeds the actuation time of flipper assemblies 116a, 116b, the article may contact the distal end of arm 117a, which may result in damage to the article. For this given conveying speed, contact with the distal end of arm 117a may be avoided by offsetting flipper assemblies 116a and 116b along the longitudinal axis of bed 112. Although this will result in a gap between the ends of arms 117a and 117b, the momentum of the article, which is substantially unimpeded by contact with arm 117b, will be sufficient so that the article will be transferred onto arm 117a and without significantly slowing the forward motion of the article being diverted. When arms 117a and 117b are pivoted to their diverting position, the distal ends of respective arms are offset and spaced apart, for example in a range of about 2 inches to about 10 inches. As noted above, by offsetting the respecting arms 117a, 117b along the longitudinal axis of conveying section 114, the distance the article has to travel before it would make contact with the distal end of arm 117a is increased, thereby avoiding contact of the article with the distal end of arm 117a when the article conveyance speed is increased. Or on other words, by offsetting flipper assemblies 116a and 116b, the rate of travel of the respective articles can be increased. Arms 117a and 117b may be actuated simultaneously by a common drive assembly similar to drive assembly 118 or may be individually driven by a respective assembly.

While several forms of the invention have been shown and described, other forms will now be apparent to those skilled in the art. For example, although illustrated as a symmetrical assembly, arms 117a and 117b may have different lengths with their ends generally meeting at a location offset from the center of the conveying surface or with their ends generally meeting at the center of the conveying surface but with the proximate end of the arm beyond the pivot axis which provides the extended diverting surface or "bridge" being reduced or eliminated. For example, the initial contact arm may have its diverting belt driven about the same axis that it is pivoted since the additional diverting surface which extends beyond the conveying surface may not be needed for that side of the diverter assembly. Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

The embodiments of the invention in which an exclusive property right or privilege is claimed are defined as follows:

1. A diverter assembly comprising:
    a generally horizontal conveying surface;
    a pair of flipper assemblies on opposite sides of said conveying surface that are collinear in an actuated position;
    a driven diverting surface defined on each flipper assembly; and
    an actuator for substantially concurrently actuating said flipper assemblies to said actuated position and driving said driven diverting surfaces wherein an article on said conveying surface is diverted wherein said actuator extends downwardly from said horizontal conveying surface no more than 18 inches.

2. The diverter assembly in claim 1, wherein said diverting surfaces are high friction surfaces.

3. The diverter assembly in claim 1, wherein said driven diverting surfaces comprise driven belts.

4. The diverter assembly in claim 1, wherein said diverting surfaces of said flipper assemblies are at an angle with respect to the direction of travel of articles on said horizontal conveying surface that is in a range of from 20° to 60°.

5. The diverter assembly in claim 4, wherein said angle is approximately 45°.

6. The diverter assembly in claim 1, wherein said actuator extends downwardly from said horizontal conveying surface no more than 12 inches.

7. A diverter assembly comprising:
    a generally horizontal conveying surface;
    a pair of flipper assemblies on opposite sides of said conveying surface that are collinear in an actuated position;
    a driven diverting surface defined on each flipper assembly; and
    an actuator for substantially concurrently actuating said flipper assemblies to said actuated position and driving said driven diverting surfaces wherein an article on said conveying surface is diverted, wherein said actuator comprises a motor and a clutch selectively connecting said motor with said flipper assemblies.

8. The diverter assembly in claim 7 capable of diverting at least 60 articles per minute.

9. The diverter assembly in claim 8 capable of diverting at least 80 articles per minute.

10. The diverter assembly according to claim 7, wherein each flipper assembly includes an arm, said arms including distal end, and said distal ends being generally adjacent when said flipper assemblies are actuated said actuated position.

11. The diverter assembly according to claim 7, wherein each of said flipper assemblies includes an arm, said arms including distal cads and proximate ends, said arms being pivoted about proximate ends when said flipper assemblies are actuated to said actuated position.

12. A method of diverting articles comprising:
    conveying articles in a generally horizontal direction at a conveying speed, said conveying including conveying articles on a conveying surface;
    positioning a diverting surface at an angle to the direction of travel of an article to horizontally dived the article in a diverting direction; and
    driving said diverting surface at a diverting speed greater than said conveying speed wherein a diverted article substantially maintains the same magnitude of speed in the conveying direction when diverted, wherein said diverting surface includes at least two surface portions on opposite sides of said conveying surface which are selectively positionable in a collinear to divert articles.

13. The method of claim 12, wherein said conveying articles includes conveying luggage.

14. A diverter assembly comprising:
    a conveying surface having a conveying direction and for conveying an article at a convoying speed;
    a pair of arms at opposite sides of said convoying surface, said anus mounted for pivotal movement between a non-diverting position wherein said arms are adjacent said conveying surface and a diverting position wherein said arms are pivoted across said conveying surface;

a driven diverting surface defined at each of said arms; and a drive assembly for selectively substantially concurrently moving said anus between said diverting position and said non-diverting position wherein an article conveyed on said conveying surface is diverted in a diverting direction when the article contacts at least one of said arms when said at least one arm is in said diverting position, and said drive assembly driving said driven diverting surfaces and adapted to decouple movement of said arms from the driving of said driven diverting surfaces.

15. The diverter assembly according to claim 14, wherein said diverting surface comprises high friction surfaces.

16. The diverter assembly in claim 14, wherein said driven diverting surfaces comprise driven belts.

17. The diverter assembly in claim 14, wherein at least one of said arms is angled with respect to said conveying direction in a range from 20° to 60° when said at least one arm is in said diverting position.

18. The diverter assembly according to claim 17, wherein said angle is approximately 45°.

19. The diverter assembly in claim 14, wherein said arms are generally collinear when said arms are pivoted to said diverting position.

20. The diverter assembly according to claim 14, wherein at least one of said arms comprises a horizontal extent and a belt extending around said horizontal extent, said belt being driven about said horizontal extent and providing said driven diverting surface for said at least one arm.

21. The diverter assembly according to claim 20, wherein said at least one arm includes a vertical extent, said belt extending along at least a portion of said vertical extent.

22. The diverter assembly according to claim 21, wherein said vertical extent is at least 12 inches.

23. The diverter assembly according to claim 20, wherein each of said arms includes a horizontal extent and a belt extending around said horizontal extent, said belts being driven around their respective horizontal extents and providing said driven diverting surfaces.

24. The diverter assembly according to claim 14, wherein at least one of said driven diverting surfaces comprises a drive belt.

25. The diverter assembly according to claim 24, wherein said drive belt is driven by a driven roller, said driven roller driven by said drive assembly.

26. The diverter assembly according to claim 25, wherein said driven roller includes a driven axis about which said driven roller is driven, and said arm pivoting about a pivot axis when pivoting between said non-diverting position and said diverting position.

27. The diverter assembly according to claim 26, wherein said driven axis and said pivot axis are generally collinear.

28. The diverter assembly according to claim 26, wherein said driven axis and said pivot axis are spaced apart.

29. A diverter assembly comprising:
a conveying surface having a conveying direction and for conveying an article at a conveying speed;
a pair of arms at opposite sides of said conveying surface, said antis mounted for pivotal movement between a non-diverting position wherein said arms are adjacent said conveying surface and a diverting position wherein said arms are pivoted across said conveying surface;
a driven diverting surface defined at each of said arms, wherein at least one of said driven diverting surfaces comprises a drive belt, said drive belt being driven by a driven roller; and a drive assembly for selectively substantially concurrently moving said arms between said diverting position and said non-diverting position wherein an article conveyed on said conveying surface is diverted in a diverting direction when the article contacts at least one of said arms when said at least one arm is in said diverting position, and said drive assembly driving said driven diverting surfaces at a speed approximately equal to the conveying speed divided by a cosine of an angle between said conveying direction and said diverting direction, said driven roller driven by said drive assembly, said driven roller including a driven axis about which said driven roller is driven, each of said arms pivoting about a pivot axis when pivoting between said non-diverting position and said diverting position, wherein said drive assembly is adapted to de-couple movement of said drive belts about said driven axes from movement of said arms about said pivot axes.

30. The diverter assembly according to claim 29, wherein said drive assembly includes a clutch assembly to decouple said movement.

31. The diverter assembly according to claim 29, when in said diverting position said arms are pivoted wit a portion of said arms extending across said conveying surface and another portion of said arms extending beyond said conveying surface, said other portion of said at least one arm for continuing to drive the article when the article is diverted off said conveying surface.

32. The diverter assembly according to claim 29, wherein said driven diverting surfaces comprise driven belt.

33. The diverter assembly according to claim 29, wherein at least one of said arms is angled with respect to a conveying direction of said conveying surface in a range from 20° to 60° when said at least one arm is in said diverting position.

34. The diverter assembly according to claim 33, wherein said angle is approximately 45°.

35. The diverter assembly according to claim 29, wherein said arms are generally co-linear when said arms are pivoted to said diverting position.

36. The diverter assembly according to claim 29, wherein said conveying surface has a conveying direction, each of said arms including a distal end, and said distal arms being generally adjacent when said arms are pivoted to said diverting position.

37. The diverter assembly according to claim 14, wherein said drive assembly drives said driven diverting surfaces at a speed approximately equal to a conveying speed of said conveying surface divided by a cosine of an angle between said conveying direction and said diverting direction.

38. A diverter assembly comprising:
a conveyor section having a generally horizontal conveying surface;
a pair of arms at opposed sides of said conveying surface, said arms mounted for pivotal movement between a non-diverting position and a diverting position wherein at least a portion of said arms are pivoted across said conveying surface, and said conveying surface adapted to be selectively lowered at said arms when said arms are in said diverting position; and
a drive assembly for selectively moving said arms between said diverting position and said non-diverting position wherein an article conveyed on said conveying surface is diverted in a diverting direction when the article contacts at least one of said arms when said at least one arm is in said diverting position.

39. The diverter assembly according to claim 38, further comprising a driven diverting surface defined at each of said arms.

40. The diverter assembly according to claim 39, wherein said diverting surfaces comprise driven belts.

41. The diverter assembly according to claim 40, wherein said arms are generally collinear when said arms are pivoted to said diverting position.

42. The diverter assembly according to claim 40 wherein said driven belts are driven at a speed equal to a conveying speed of said conveying surface divided by a cosine of an angle between said conveying direction and said diverting direction.

43. The diverter assembly according to claim 42, wherein said drive assembly drives said driven belts.

44. A diverter assembly comprising:
a conveyor section having a generally horizontal conveying surface;
a pair of arms at opposed sides of said conveying surface, said arms mounted for pivotal movement between a non-diverting position and a diverting position wherein at least a portion of said arms are pivoted across said conveying surface, and said conveying surface adapted to be selectively lowered at said arms when said arms are in said diverting position;
a drive assembly for selectively moving said arms between said diverting position and said non-diverting position wherein an article conveyed on said conveying surface is diverted in a diverting direction when the article contacts at least one of said arms when said at least one arm is in said diverting position; and
a driven diverting surface defined at each of said arms, said diverting surfaces comprise driven belts, wherein said driven belts are driven at a speed equal to a conveying speed of said conveying surface divided by a cosine of an angle between said conveying direction and said diverting direction, wherein said drive assembly is adapted to decouple movement of said driven belt from movement of said arms.

45. A diverter assembly comprising:
a generally horizontal conveying surface;
a pair of arms on opposed sides of said conveying surface, said arms mounted for pivotal movement between a non-diverting position wherein said arms are adjacent said conveying surface and a diverting position wherein at least a portion of said arms are pivoted across said conveying surface;
a driven diverting surface defined at each of said arms, and said driven diverting surface having a vertical height of at least 12 inches; and
a drive assembly for selectively moving said arms between said diverting position and said non-diverting position wherein an article conveyed on said conveying surface is diverted in a diverting direction when the article contacts at least one of said arms when said at least one arm is in said diverting position, wherein said drive assembly drives said driven diverting surfaces and said drive assembly is adapted to decouple movement of said driven diverting surfaces from movement of said arms.

46. The diverter assembly according to claim 45, wherein said driven diverting surfaces comprise driven belts.

47. The diverter assembly according to claim 46, wherein each of said arms includes a horizontal extent, said driven belts being driven around said horizontal extents of said arms.

48. The diverter assembly according to claim 47, wherein said driven belts are rotated about a pair of belt axes, and said arms pivoting about a pivot axis spaced inwardly from one of said belt axes.

49. A method of selectively diverting user-packed luggage to particular destinations, wherein the luggage may be made up of various sizes and configurations up to a maximum dimension, said method comprising:
providing a pair of flipper assemblies at substantially each of said destinations, wherein each of said pair of flipper assemblies comprises a driven diverting surface having a height of at least one-half of said maximum dimension;
providing an actuator;
passing the luggage past the flipper assemblies in sequence; and
actuating a respective pair of said flipper assemblies with the actuator at a desired destination for a selected luggage item; and
driving the driven diverting surfaces of the respective pair of flipper assemblies with the actuator.

50. The method according to claim 49, wherein said actuating the pair of said flipper assemblies includes pivoting the pair of flipper assemblies to a diverting position substantially simultaneously.

51. The method according to claim 49, further comprising driving the diverting surface at a speed greater than a speed of said passing whereby the forward speed of the luggage is substantially unchanged when diverted by the flipper assemblies.

52. The method according to claim 49, wherein said actuating includes diverting the luggage in a diverting direction, said passing including conveying the luggage in a conveying direction, and the diverting direction being angled with respect to the conveying direction.

53. The method according to claim 52 wherein said diverting diverts luggage at a diverting speed, and said passing conveying the luggage wherein the luggage has a forward speed, said method further comprising at least maintaining the forward speed of the luggage generally constant when diverting the luggage.

54. The method according to claim 53 wherein said diverting includes driving the driven diverting surface at a speed greater than the forward speed of the luggage.

55. The method according to claim 54, said method further comprising at least maintaining the forward speed of the luggage generally constant when diverting the luggage.

56. The method according to claim 49, wherein said passing comprises conveying the luggage in a conveying direction.

57. The method according to claim 56 wherein said actuating includes diverting the luggage in a diverting direction.

58. The method according to claim 57, wherein the luggage has a forward speed, said diverting including driving the driven diverting surface at a speed equal to the forward speed of the luggage when being conveyed divided by the cosine of the angle between the conveying direction and the diverting direction to thereby reduce the impact on the luggage being diverted.

59. The method according to claim 57, wherein said diverting includes driving the driven diverting surface and pivoting the pair of flipper assemblies.

60. The method according to claim 59 further comprising selectively decoupling said driving the driven diverting surface and said pivoting.

61. The method according to claim 49, wherein said pivoting includes aligning the pair of the flipper assemblies along a common axis when the flipper assemblies are pivoted to their diverting position.

62. The diverter assembly according to claim 38, wherein said conveyor section includes a bed, said conveying surface moving across said bed, said bed including a recessed portion proximate said arms, wherein said conveying surface can lower should an article get snagged under said arms to thereby release a snagged article.

63. The method according to claim 49, wherein said pivoting includes aligning the pair of the flipper assemblies along a common axis when the flipper assemblies are pivoted to their diverting position.

* * * * *

UNITED STATES PATENT AND TRADEMARK OFFICE
CERTIFICATE OF CORRECTION

PATENT NO. : 6,607,065 B2
DATED : August 19, 2003
INVENTOR(S) : George W. Peppel It is certified that error appears in the above-identified patent and that said Letters Patent is hereby corrected as shown below:

Column 5,
Line 26, "filly" should be -- fully --

Column 14,
Line 37, insert -- to -- between "actuated" and "said"
Line 41, "cads" should be -- ends --
Line 49, "dived" should be -- diverted --
Line 57, insert -- fashion -- between "collinear" and "to"
Lines 62 and 63, "conveying" should be -- conveying --
Line 64, "anus" should be -- arms --

Column 15,
Line 4, "anus" should be -- arms --
Line 60, "antis" should be -- arms --

Column 16,
Line 24, "wit" should be -- with --

Signed and Sealed this

Fifth Day of October, 2004

JON W. DUDAS
*Director of the United States Patent and Trademark Office*